US008422885B2

(12) United States Patent
Adhikari et al.

(10) Patent No.: US 8,422,885 B2
(45) Date of Patent: *Apr. 16, 2013

(54) BANDWIDTH ALLOCATION AND MANAGEMENT SYSTEM FOR CELLULAR NETWORKS

(75) Inventors: Prasanna Adhikari, San Diego, CA (US); Hus Tigli, La Jolla, CA (US); Robert A Fein, Newton Center, MA (US)

(73) Assignee: Trex Enterprises Corp, San Diego, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/799,023

(22) Filed: Apr. 16, 2010

(65) Prior Publication Data

US 2010/0266287 A1 Oct. 21, 2010

Related U.S. Application Data

(63) Continuation-in-part of application No. 12/592,238, filed on Nov. 21, 2009.

(60) Provisional application No. 61/212,814, filed on Apr. 16, 2009.

(51) Int. Cl.
*H04B 10/00* (2006.01)
*H04B 1/38* (2006.01)
*H04W 72/00* (2009.01)
*H04W 40/00* (2009.01)
*H04W 4/00* (2009.01)

(52) U.S. Cl.
USPC ........... 398/115; 455/453; 455/447; 455/561; 370/329

(58) Field of Classification Search .................. 398/115; 455/447; 370/329
See application file for complete search history.

(56) References Cited

U.S. PATENT DOCUMENTS

| | | | | | |
|---|---|---|---|---|---|
| 5,978,117 | A | * | 11/1999 | Koonen | 398/116 |
| 6,674,966 | B1 | * | 1/2004 | Koonen | 398/70 |
| 7,280,500 | B2 | * | 10/2007 | Semper et al. | 370/328 |
| 7,603,127 | B2 | * | 10/2009 | Chung et al. | 455/453 |
| 7,725,110 | B2 | * | 5/2010 | Weigand | 455/452.1 |
| 7,979,078 | B2 | * | 7/2011 | Tiedemann et al. | 455/453 |
| 8,050,222 | B2 | * | 11/2011 | Maeda et al. | 370/329 |
| 2002/0165002 | A1 | * | 11/2002 | Kolinko et al. | 455/500 |
| 2003/0119534 | A1 | * | 6/2003 | Kostic et al. | 455/501 |
| 2005/0147024 | A1 | * | 7/2005 | Jung et al. | 370/203 |

(Continued)

*Primary Examiner* — Kenneth N Vanderpuye
*Assistant Examiner* — Amritbir Sandhu
(74) *Attorney, Agent, or Firm* — John R. Ross

(57) ABSTRACT

A bandwidth allocation and management system for cellular communication networks. The system includes at least one master optical switch and processing station, a number of aggregation base stations that are in optical fiber communication with a master optical switching and processing station and a number of auxiliary cellular base stations surrounded by and supported by each aggregation base station. In preferred embodiments a plurality of sets of three neighboring base stations are each adapted to receive and process RF signals transmitted by cellular users within a broadcast and receive range and transmit the RF signals received, by each of the three neighborhood base stations, from each of the cellular users in analog form to the master optical switching and processing station. The master optical switching and processing station processes the three RF signals and combine, for each user within the broadcast and receive range, the three RF signals and to convert the combined RF signals to digital form for transmission to other users in the communication network.

14 Claims, 20 Drawing Sheets

Master Optical Switching and Processing Station (MOSPS)

U.S. PATENT DOCUMENTS

| | | | |
|---|---|---|---|
| 2005/0266849 A1* | 12/2005 | Li et al. ................... | 455/436 |
| 2006/0073837 A1* | 4/2006 | Tanaka et al. ............. | 455/453 |
| 2006/0148484 A1* | 7/2006 | Zhang et al. .............. | 455/450 |
| 2006/0172775 A1* | 8/2006 | Conyers et al. ............ | 455/561 |
| 2007/0223606 A1* | 9/2007 | Yang et al. ................ | 375/260 |
| 2008/0057996 A1* | 3/2008 | Sung et al. ................ | 455/522 |
| 2008/0151846 A1* | 6/2008 | Scheinert et al. .......... | 370/338 |
| 2008/0159131 A1* | 7/2008 | Hoeflin et al. ............. | 370/230 |
| 2008/0159212 A1* | 7/2008 | Zhang et al. .............. | 370/329 |
| 2009/0069008 A1* | 3/2009 | Highsmith et al. ......... | 455/424 |
| 2009/0232084 A1* | 9/2009 | Li et al. ................... | 370/330 |
| 2010/0067450 A1* | 3/2010 | Balachandran et al. ..... | 370/329 |
| 2010/0135196 A1* | 6/2010 | Cheng et al. .............. | 370/312 |
| 2010/0246520 A1* | 9/2010 | Andersson ................. | 370/329 |
| 2010/0322177 A1* | 12/2010 | Luo et al. ................. | 370/329 |
| 2011/0026483 A1* | 2/2011 | Rudrapatna et al. ........ | 370/330 |
| 2011/0286415 A1* | 11/2011 | Lee et al. .................. | 370/329 |
| 2012/0033604 A1* | 2/2012 | Hirakawa et al. .......... | 370/312 |
| 2012/0039284 A1* | 2/2012 | Barbieri et al. ............ | 370/329 |
| 2012/0170507 A1* | 7/2012 | Sawai ....................... | 370/315 |
| 2012/0188888 A1* | 7/2012 | Wang et al. ............... | 370/252 |
| 2012/0218969 A1* | 8/2012 | Tan .......................... | 370/329 |

\* cited by examiner

Base Station with Sectorized Antenna (Top View)

PRESENT INVENTION

SIR > 1/8 Everywhere in a cell

PRIOR ART

SIR = 1 (Cell Boundary)    SIR ~ 1/4

PRESENT INVENTION

BANDWIDTH ALLOCATION AND MANAGEMENT SYSTEM FOR CELLULAR NETWORKS

CROSS REFERENCE TO RELATED APPLICATIONS

This application claims the benefit of provision patent application Ser. No. 61/212,814 filed Apr. 16, 2009 and is a continuation-in-part application of Ser. No. 12/592,238, filed Nov. 21, 2009, each of which are incorporated herein by reference.

FIELD OF THE INVENTION

The present invention relates to cellular communication systems and in particular to high data rate cellular communication systems.

BACKGROUND OF THE INVENTION

Local Wireless Radio Communication

WiFi and WiMax

Local wireless communication services represent a very rapidly growing industry. These services include paging and cellular telephone services and wireless internet services such as WiFi and WiMax. WiFi refers to communication systems designed for operation in accordance with IEEE 802.11 standards and WiMax refers to systems designed to operate in accordance with IEEE 802.16 standards. Communication under these standards is typically in unlicensed portions of the 2-11 GHz spectral range although the original IEEE 802.16 standard specifies the 10-66 GHz range. Use of these WiFi bands does not require a license in most parts of the world provided that the output of the system is less than 100 milliwatts, but the user must accept interferences from other users of the system. Up-to-date descriptions of these WiFi and WiMax systems are available on the Internet from sources such as Google. Wireless computer networking and internet connectivity services are also growing at a rapid rate. Wireless computer networking and Internet connectivity services are growing at a rapid rate.

Cellular Telephones

The cellular telephone industry currently is in its third generation with several types of cellular telephone systems being promoted. The cellular market in the United States grew from about 2 million subscribers and $2 billion in revenue in 1988 to more than 60 million subscribers and about $30 billion in revenue in 1998 and the growth is continuing in the United States and also around the world as the services become more available and prices decrease.

A cellular service provider divides its territory up into generally hexagonal cells. These cells may be about 5 miles across, although in densely populated regions with many users these cells may be broken up into much smaller cells called micro cells. This is done because cellular providers are allocated only a limited portion of the radio spectrum. For example, one spectral range allocated for cellular communication is the spectral range: 824 MHz to 901 MHz. (Another spectral range allocated to cellular service is 1.8 GHz to 1.9 GHz) A provider operating in the 824-901 MHz range may set up its system for the cellular stations to transmit in the 824 MHz to 851 MHz range and to receive in the 869 MHz to 901 MHz range. The transmitters both at the cellular stations and in devices used by subscribers operate at very low power (just a few Watts) so signals generated in a cell do not provide interference in any other cells beyond immediate adjacent cells. By breaking its allocated transmitting spectrum and receive spectrum in several parts with the hexagonal cell pattern, a service provider can set up its system so that there is a two-cell separation between the same frequencies for transmit or receive. Therefore, these several spectral ranges can be used over and over again throughout the territory of the cellular service provider. In a typical cellular system each cell (with a transmit bandwidth and a receive bandwidth each at about 12 MHz wide) can handle as many as about 1200 two-way telephone communications within the cell simultaneously. With lower quality communication, up to about 9000 calls can be handled in the 12 MHz bandwidth. Several different techniques are widely used in the industry to divide up the spectrum within a given cell. These techniques include analog and digital transmission and several techniques for multiplexing the digital signals. These techniques are discussed at pages 313 to 316 in The Essential Guide to Telecommunications, Second Edition, published by Prentice Hall and many other sources. Third and fourth generation cellular communication systems promise substantial improvements with more efficient use of the communication spectra.

Other Prior Art Wireless Communication

Techniques for Point-to-Point and Point-to-Multi-Point

Most wireless communication, at least in terms of data transmitted, is one way, point-to-multi-point, which includes commercial radio and television. However, there are many examples of point-to-point wireless communication. Cellular telephone systems, discussed above, are examples of low-data-rate, point-to-point communication. Microwave transmitters on telephone system trunk lines are another example of prior art, point-to-point wireless communication at much higher data rates. The prior art includes a few examples of point-to-point laser communication at infrared and visible wavelengths.

Information Transmission

Analog techniques for transmission of information are still widely used; however, there has recently been extensive conversion to digital, and in the foreseeable future transmission of information will be mostly digital with volume measured in bits per second. To transmit a typical telephone conversation digitally utilizes about 5,000 bits per second (5 Kbits per second). Typical personal computer modems connected to the Internet operate at, for example, 56 Kbits per second. Music can be transmitted point to point in real time with good quality using MP3 technology at digital data rates of 64 Kbits per second. Video can be transmitted in real time at data rates of about 5 million bits per second (5 Mbits per second). Broadcast quality video is typically at 45 or 90 Mbps. Companies (such as line telephone, cellular telephone and cable companies) providing point-to-point communication services build trunk lines to serve as parts of communication links for their point-to-point customers. These trunk lines typically carry hundreds or thousands of messages simultaneously using multiplexing techniques. Thus, high volume trunk lines must be able to transmit in the gigabit (billion bits, Gbits, per second) range. Most modern trunk lines utilize fiber optic lines. A typical fiber optic line can carry about 2 to 10 Gbits per second and many separate fibers can be included in a trunk line so that fiber optic trunk lines can be designed and constructed to carry any volume of information desired virtually without limit. However, the construction of fiber optic trunk lines is expensive (sometimes very expensive) and the design and the construction of these lines can often take many months especially if the route is over private property or produces environmental controversy. Often the expected revenue from the potential users of a particular trunk line under consideration does not justify the cost of the fiber optic trunk line.

Very high data rate communication trunk lines, such as optical fiber trunk lines or high data rate cable communication systems, currently provide very broad geographical coverage and they are expanding rapidly throughout the world, but they do not go everywhere. Access points to the existing high data rate trunk lines are called "points of presence". These points of presence are physical locations that may also house servers, routers, ATM switches and digital/analog call aggregators. For Internet systems, these locations may be the service provider's own equipment or part of the facilities of a telecommunications provider that an Internet service provider rents.

Digital microwave communication has been available since the mid-1970's. Service in the 18-23 GHz radio spectrum is called "short-haul microwave" providing point-to-point service operating between 2 and 7 miles and supporting between four to eight T1 links (each carrying data at 1.544 Mbps). Recently, microwave systems operating in the 11 to 38 Ghz band have been designed to transmit at rates up to 155 Mbps (which is a standard transmit frequency known as "OC-3 Standard") using high order modulation schemes.

Data Rate and Frequency

Bandwidth-efficient modulation schemes allow, as a general rule, transmission of data at rates of about 1 to 8 bits per second per Hz of available bandwidth in spectral ranges including radio wavelengths to microwave wavelengths. Data transmission requirements of 1 to tens of gbps thus would require hundreds of MHz of available bandwidth for transmission. Equitable sharing of the frequency spectrum between radio, television, telephone, emergency services, military, and other services typically limits specific frequency band allocations to about 10% fractional bandwidth (i.e., range of frequencies equal to about 10% of center frequency). AM radio, at almost 100% fractional bandwidth (550 to 1650 KHz) is an anomaly; FM radio, at 20% fractional bandwidth, is also atypical compared to more recent frequency allocations, which rarely exceed 10% fractional bandwidth.

Reliability Requirements

Reliability typically required for trunkline wireless data transmission is very high, consistent with that required for hard-wired links including fiber optics. Typical specifications for error rates are less than one bit in ten billion ($10^{-10}$ bit-error rate), and link availability of 99.999% (5 minutes of down time per year). This necessitates all-weather link operability, in fog and snow, and at rain rates up to 100 mm/hour in many areas. On the other hand, cellular telephone systems and wireless interne access systems do not require such high reliability. As a matter of fact cellular users (especially mobile users) are accustomed to poor service in many regions.

Weather Conditions

In conjunction with the above availability requirements, weather-related attenuation limits the useful range of wireless data transmission at all wavelengths shorter than the very long radio waves. Typical ranges in a heavy rainstorm for optical links (i.e., laser communication links) are 100 meters, and for microwave links, 10,000 meters.

Atmospheric attenuation of electromagnetic radiation increases generally with frequency in the microwave and millimeter-wave bands. However, excitation of rotational modes in oxygen and water vapor molecules absorbs radiation preferentially in bands near 60 and 118 GHz (oxygen) and near 23 and 183 GHz (water vapor). Rain attenuation, which is caused by large-angle scattering, increases monotonically with frequency from 3 to nearly 200 GHz. At the higher, millimeter-wave frequencies, (i.e., 30 GHz to 300 GHz corresponding to wavelengths of 1.0 centimeter to 1.0 millimeter) where available bandwidth is highest, rain attenuation in very bad weather limits reliable wireless link performance to distances of 1 mile or less. At microwave frequencies near and below 10 GHz, link distances to 10 miles can be achieved even in heavy rain with high reliability, but the available bandwidth is much lower.

Setting-Up Additional Cells in a Telephone System is Expensive

The cost associated with setting up an additional cell in a new location or creating a micro cell within an existing cell with prior art techniques is in the range of about $650,000 to $800,000. (See page 895 Voice and Data Communication Handbook, Fourth Edition, published by McGraw Hill.) These costs must be recovered from users of the cellular system. People in the past have avoided use of their cellular equipment because the cost was higher that their line telephones. Recently, costs have become comparable.

Frequency Reuse

Modern cellular systems reuse frequency at a ratio typically of 1:3. Reuse of frequency enables greater spectral efficiency of the system, but is limited by the need to prevent interference. Many methods have been proposed to increase spectral efficiency through enhanced frequency reuse, including differential power based on distance from the cellular station—allocation based on varying concentric circles from the base station (see U.S. Pat. No. 5,758,090), several different hybrid satellite systems, scheduling systems (see U.S. Pat. No. 7,519,013), active antenna and other designs. None of these systems, however, enables optimal sharing of frequency from neighboring cell sites through a centralized control system.

Distributed Antenna Systems

Distributed antenna systems (DAS) is a broad term that can include cellular systems with base stations at least one of which provide support (usually through a fiber link) for one or more simplified remote cellular station having substantially less equipment than a standard base station. These remote cellular stations are sometime referred to as remote radio heads (RRH) or RF over Fiber (RFoF). The fiber link in prior art systems is typically an optical fiber or coaxial cable. This allows for a relatively simple station to be placed near users, instead of a complex cell site. The equipment in these remote cellular stations may be limited to an antenna for low frequency communication with user cellular equipment such as cell phones and other electronic communication equipment including PDA's and laptop computers and equipment for conversion of low frequency cellular signals typically in the range of 800 to 2000 megahertz into a high data rate signal which is transmitted to the supporting base station via the optical fiber or the coaxial cable.

A typical cell site approaches the size of a trailer, has several hundred thousand dollars of equipment, and prodigious power and telecom requirements. It often is not feasible or prudent to locate these everywhere where a cell site is required. All equipment needs to be located very close to the antennas on a tower because of transmission losses. By centralizing the "smarts" of a cell site, a location well suited to these requirements can be selected, while the remote cellular stations with their low frequency antennas can be independently located in their ideal location. The typical base station equipment includes (1) transport management electronic and communication equipment (hereinafter referred to a "transport management equipment" or "TM", (2) equipment for data conversion from high frequency broadband signals to low frequency signals, including analog to digital and digital to analog components, (hereinafter referred to as "broadband equipment" or "BB" and (3) radio frequency (hereinafter referred to as radio frequency equipment or "RF" for communication with cell phones and other cellular equipment.

Cell carriers are being driven to DAS by a number of factors including a desire to minimize capital expenditures as well as operating expenses and the need for densely spaced cell sites. Typical capital expenses include base site equipment, site acquisition and construction. All of these are positively affected by the DAS architecture. A single base site can typically support a dozen or more antenna sites using the DAS architecture, versus a one-to-one relationship with a traditional architecture. The ability to have small remote footprints adds to the number of spots suitable to host a site, and reduces acquisition and development costs. This savings is often more than a linear relationship between the differences in size.

Operating expenses include electrical expenses, telecom lines, lease costs, and system maintenance. Electrical costs consist of radio frequency (RF) equipment, and climate control. RF signal losses can be significant in a traditional cell site, with 50% or more power lost through cables and a resultant increase in electrical costs. Remote antenna systems are outdoor mounted and require no additional cooling. Lease costs share the same advantage as the capital acquisition costs due to the reduced footprint of remote units. Since all of the intelligence of the equipment is located at a single point a dozen or more antenna sites can be upgraded, managed or maintained by working at one base.

The pressure for more cell sites is driven by the increased prevalence of third generation cellular type services, increased number of subscribers, and in some cases extension of service footprints. Third generation services demand more sites because of saturating a maximum aggregate data rate of a cell site, and distance limitations of these services. The high data rate services (i.e. at 300 kbps or greater) are typically only available within 1.5 km of a cell site. These factors in combination require a re-planning of cell sites to a cell diameter of 200-500 meters in urban areas and 1.5 km in suburban areas.

The case for cellular operators to migrate to a distributed antenna architecture system is strong, but the mechanism isn't in place in all markets. The data rates of these systems almost always exceed 1 gigabit per second (gbps), and thus require dedicated fiber. However, new site density requirements may mean that a square km in an urban area may require more than a dozen remote sites. As a result, available fiber with gigabit per second capability is often not available. The cost of new fiber is typically very high.

What is needed is a better system for bandwidth allocation and management of cellular networks and one that provides for better sharing of bandwidth among cells to increase frequency reuse and thus optimize the spectral efficiency of the cellular network.

SUMMARY OF THE INVENTION

The present invention provides a bandwidth allocation and management system for cellular communication networks. The system includes a number of aggregating base stations that are in optical fiber communication with a master optical switching and processing station. Each aggregating base station is surrounded by a number (such as about 18) of auxiliary cellular base stations, each supporting a surrounding wireless communication cell.

Auxiliary Cellular Base Stations

Each auxiliary cellular base station is in wireless communication through a number antennas (such as 3) with users in its cell at a similar number of narrow cellular frequency ranges within a broader frequency range below 11 MHz. The auxiliary cellular base stations are also in wireless millimeter wave communication with one of the aggregating base stations at a millimeter wave frequency in excess of 70 GHz. Each of the auxiliary base stations are equipped with a multiplexing/de-multiplexing switch for separating streams of digital data incoming over millimeter radio into individual streams of packetized digital baseband data directed to one of several digital baseband to carrier frequency converters located at each auxiliary base station. Each digital-baseband to carrier frequency converter extracts the baseband signal from the stream of packetized digital-baseband data by means of analog-to-digital conversion and up-converts the baseband signal to carrier frequency for transmission over a cellular radio frequency. Each auxiliary base station is also equipped with a carrier frequency to digital baseband converter. Each carrier frequency to digital-baseband converter converts signals received from cellular system users by one of several cellular antenna to a packetized digital-baseband signal by means of down-conversion to baseband signal and analog-to-digital conversion of the baseband signal. The digital-baseband signals packetized by multiple carrier to digital-baseband converters are multiplexed by a multiplexing switch and sent to millimeter wave radio for transmission to an aggregating base station.

Some of the auxiliary cellular base stations in the system are auxiliary-relay base stations that are equipped with switching and relaying equipment for multiplexing and relaying packetized digital-baseband data to and from other auxiliary base stations. The communication between the aggregation base station and each of the auxiliary cellular base stations is via a number of millimeter wave transceivers either directly or through one or more of the auxiliary-relay base stations.

Aggregation Base Stations

Aggregation base stations are equipped with all the equipment that are typically installed at the auxiliary base stations. They are also equipped with an addition number of millimeter wave radios for communication with multiple auxiliary-relay base stations. Millimeter wave radios transport packetized digital-baseband data between an aggregation base station and auxiliary-relay base stations. The aggregation base stations are equipped with a service module having an interface module for each of the millimeter wave radios installed at the aggregation base station. At the aggregating base station, digital baseband signal from all the associated auxiliary base stations are aggregated.

Service Module

Each service module is equipped with functional modules, each designed to provide wireless network functions such as baseband processing functions, multiple access functions and network functions. Each service module is also equipped with a switching module for multiplexing and de-multiplexing of packetized digital-baseband data among baseband processing functional module, millimeter wave radio and optical signal interface. Communication between the aggregation base stations and the master optical switching and processing station is via optical fiber. Each service module processes the digital baseband signals aggregated by the aggregation base station it is associated with.

Master Optical Switching and Processing Station

The master optical switching and processing station is equipped with a bank of service modules similar to the service modules in the aggregating base stations. Optical signal switching at the master optical switching and processing station is via all optical switches. This master station is equipped with a master controller in control of all of the service modules in the aggregation base stations and the service modules in the master station. The master controller at the master station is able to efficiently utilize all of the service modules in the system so that in the event the service modules in one or more aggregation base stations are on the verge of becoming over-loaded with processing of digital-baseband signal, the master system controller can transfer service functions from those service modules to the service modules in the master optical switching and processing station or to service modules in other aggregation base stations.

Traditionally, in cellular network, most of the processing of the signals is performed by equipment installed at each base station. This traditional method of processing signals at each base station requires that each base station be equipped with capability to handle its worse case load. However, this capability to handle worse case load is utilized by base stations only rarely. In the methods outlined here, instead of performing all typical functions such as baseband processing, multiple-access control at each base station, baseband signals from a number of auxiliary base stations are digitized and transported to aggregation base station where they are processed. By processing signals from large number of base station using a pool of resources, service module can take advantage of the averaging effect of load distribution among multiple base stations. For example, if no more that 5 out of the 19 base stations are expected to experience peak utilization while the remaining 14 experience half their peak load, the processing capability of service module needs to be no more than capability to handle 12 base stations at peak load, achieving about 30% efficiency, which can translate to 30% of cost saving. This efficiency is improved even further by making use of Master Optical Switching and Processing Stations, which allows averaging among a much larger number of base stations by aggregating and processing of signal from hundreds or thousands of base station. With the cost of base station reaching an upward of $200K and with each operator requiring hundreds of base stations per metropolitan area to serve its customers, the cost saving realized by the proposed method is expected to be enormous. Equally importantly, the operational expenses reduction realized due to the fewer number of equipment needed to be managed are also expected be significant.

In preferred embodiments the bandwidth allocation and management system a plurality of sets of three neighboring base stations which are each adapted to receive and process RF signals transmitted by cellular users within a broadcast and receive range of each of the three neighboring base stations and transmit the RF signals received, by each of the three neighborhood base stations, from each of the cellular users in analog form to a master optical switching and processing station. The master optical switching and processing station is adapted to process the three RF signals and combine, for each user within the broadcast and receive range, the three RF signals and to convert the combined RF signals to digital form for transmission to other users in the communication network.

DETAILED DESCRIPTION OF PREFERRED EMBODIMENTS

First Preferred Embodiment

General Layout

Figure 1:
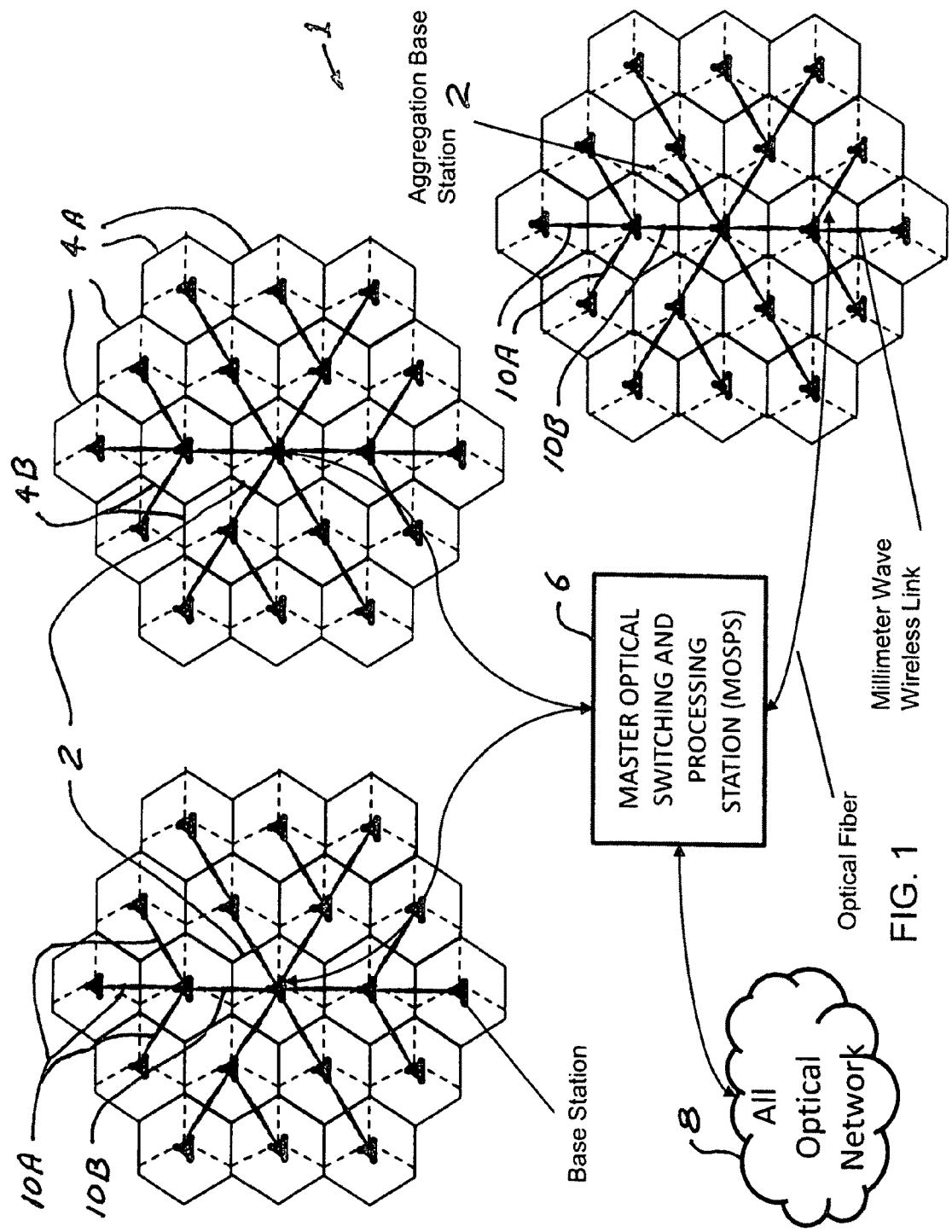
FIG. 1 is a drawing showing the principal subsystems of a preferred embodiment of the present invention.

A first preferred embodiment of the present invention can be described by reference to FIGS. 1 through 8. FIG. 1 is a layout of a bandwidth allocation and management system for a single cellular network 1. The principal components of the network include a number of aggregation base stations 2. Each aggregation base station 2 is surrounded by a number of auxiliary base stations 4A and auxiliary relay base stations 4B. In the network shown there are three aggregation base stations 2 and each of the aggregation base stations is in communication via millimeter wave radio links with 18 associated auxiliary base stations 4A and 4B. The aggregation base stations are each in fiber optical communication with a master optical switching and processing station 6 which in turn is in fiber optical communication with an all optical network 8.

Millimeter Wave Links

In this embodiment each of the aggregation base stations are in wireless communication with their associated auxiliary base station via wireless millimeter wave communication links as indicated at 10A and 10B. These wireless communication links are described in detail in U.S. patent application Ser. No. 12/011,797 which has been incorporated by reference herein and a copy of that application has been attached hereto and is a part of this provisional application. As explained in the above patent application, these millimeter wave link provide extremely narrow millimeter wave radio beams of about ½ degree which permits almost unlimited use of the same millimeter wave spectral frequency range without overlap. Millimeter wave links can be installed much more quickly and with much less expense as compared to electrical cable or optical fiber. The ranges of these beams, in general; however, are a fraction of a mile to a few miles. Also the millimeter wave links require unobstructed path. Therefore, for far away auxiliary base stations and for auxiliary base stations with no clear path to the aggregation base station, one or more relay links may be required. These relay link are preferably provided at auxiliary-relay base stations some of which are identified in FIG. 1 as 10B. As explained in the above referenced patent application, the millimeter wave radio links can transmit data at 5 Giga-bits per second. A typical cell in a modern cellular system will generate data up to about 1.5 Giga-bits per second, so the millimeter wave radio can typically easily handle communication traffic for a few cells so the relay link identified at 6 can easily handle traffic between its associated aggregation base station and the three cells that it serves. However as indicated by the above numbers the capacity of the millimeter wave links are limited.

High Speed Fiber Optic Links

A single optical fiber can carry information at rates exceeding 10 Gigabits per second and these optical fibers are typically bundled so that the information that can be carried by these links is virtually unlimited. Therefore, communication between the aggregation base stations and the master optical switching and processing stations 6 in these preferred embodiments are via optical fibers. And communication between stations 6 and other optical networks 8 are also via optical fibers.

Auxiliary Base Station Components

Figure 2:
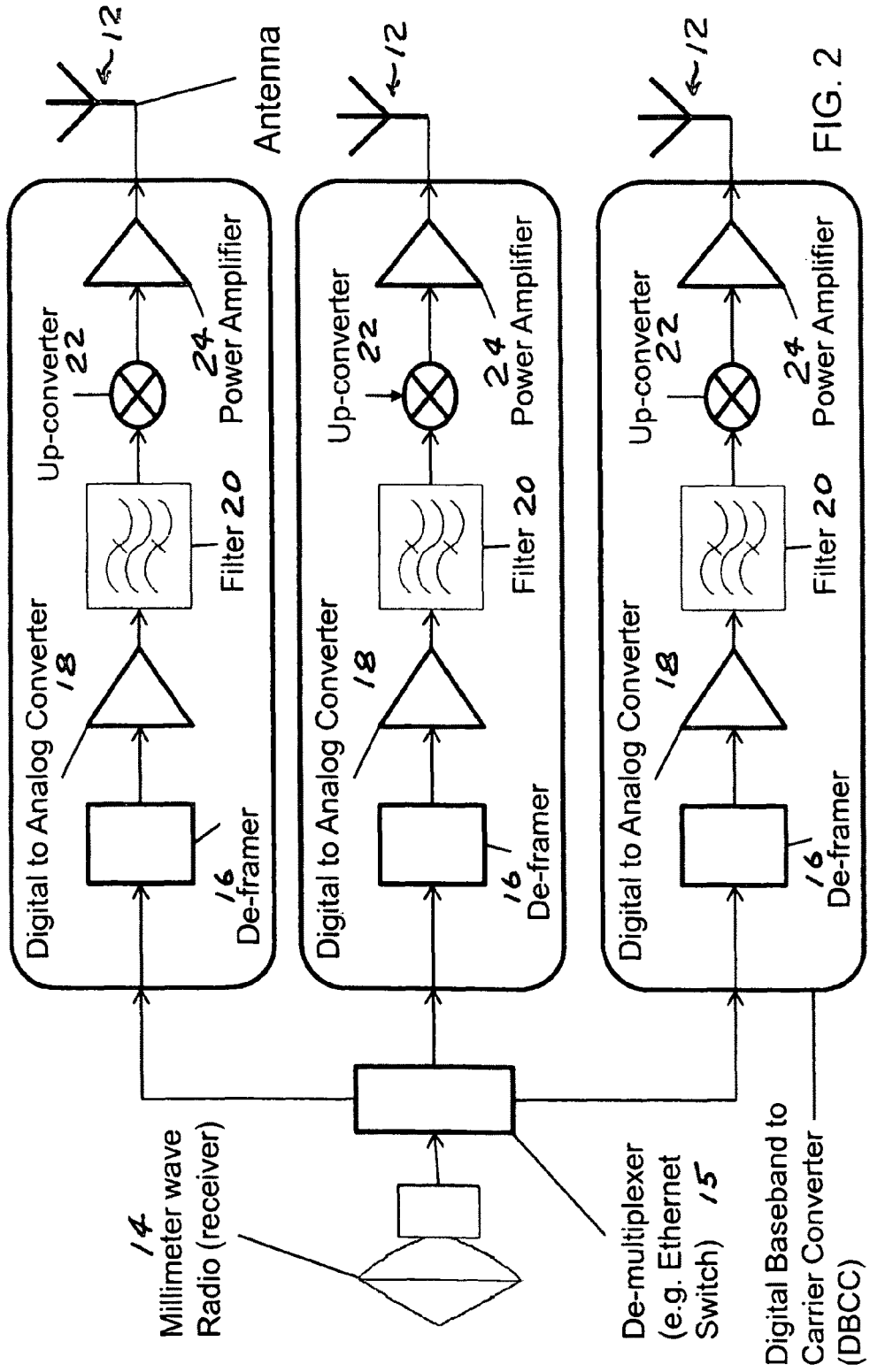
FIG. 2 shows the principal components and signal transmit path of an auxiliary base station.
Figure 3:
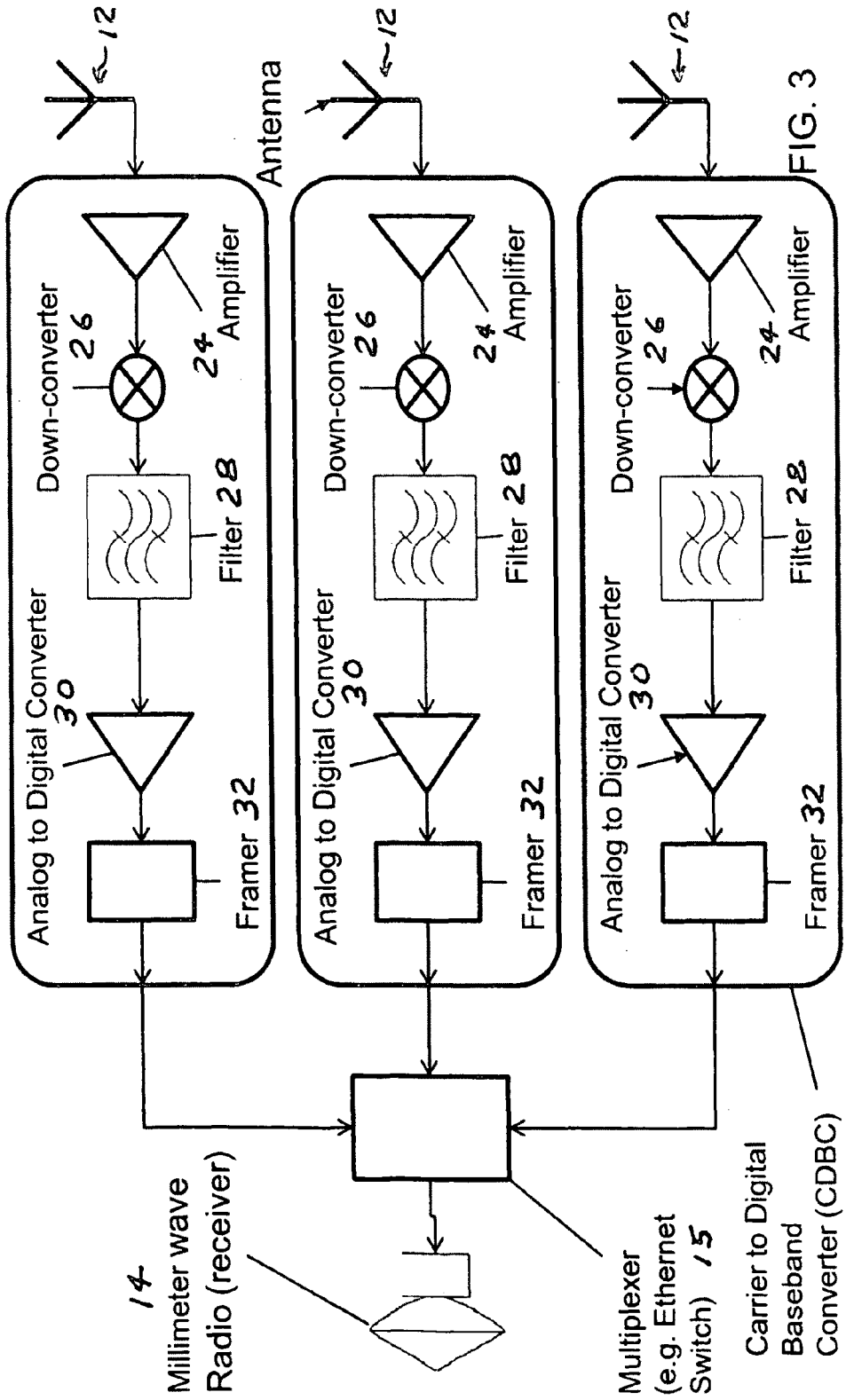
FIG. 3 shows the principal components and signal receive path of an auxiliary base station.

FIGS. 2 and 3 show important components of the auxiliary base stations. FIG. 2 shows components needed for the signal transmit path; i.e. the signal path from the millimeter wave radio transceiver 14 to the base station cellular antennas 12. FIG. 2 shows millimeter wave signals coming in from an aggregation base station (not shown). After collection by the millimeter wave radio transceiver 14 the signal passes through an Ethernet switch 15 where it is de-multiplexed into separate signals (one for each of the base station's transmit frequencies—in this case three transmit frequencies). Then for each of the separate frequencies the signal is de-framed in de-framer 16 to eliminate unneeded header type information in the signal stream. The de-framed signal is then converted to an analog baseband signal in A to D converter 18, filtered in filter 20 and up-converted in up-converter 22, amplified in power amplifier 24 and broadcast through base station antenna 12. FIG. 3 shows the opposite signal path from the auxiliary base station antennas 12 to millimeter wave transceiver 14. Here signals from the cellular system users are collected by antennas 12 amplified in amplifiers 24, down converted to baseband signal by down-converters 26, filtered in filter 28, converted to digital baseband signals in A to D converter 30, framed with appropriate header information in framer 32, multiplexed in Ethernet multiplexer 15 and transmitted to an aggregator base station 4 (not shown in FIG. 3), either directly or via a relay-auxiliary base station, with millimeter wave transceiver 14.

Auxiliary-Relay Base Station

Figure 4:
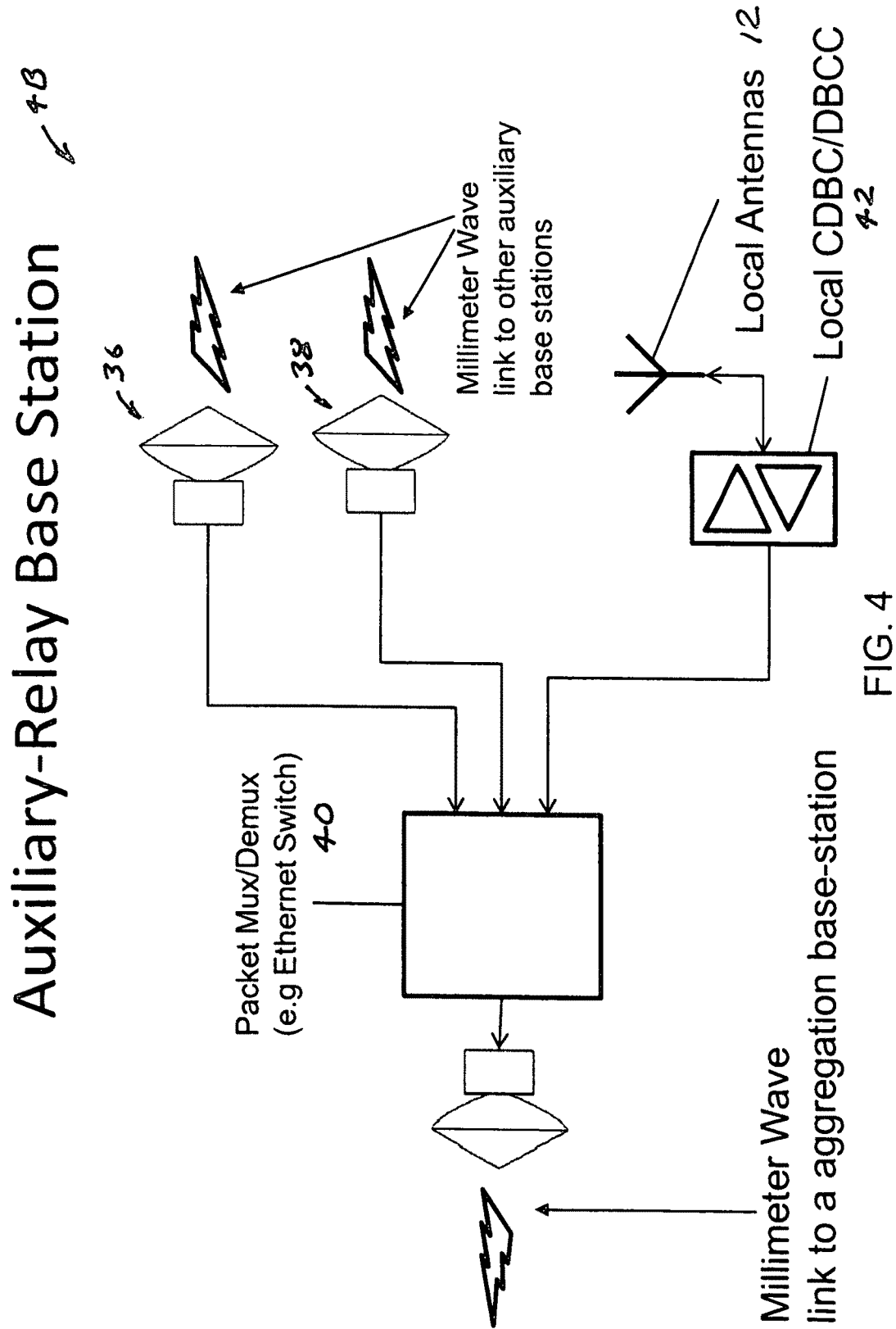
FIG. 4 is a drawing showing additional components of an auxiliary-relay base station for relaying information from an auxiliary base station to an aggregation base station.

FIG. 4 shows some of the features of an auxiliary-relay base station 4A that may not be needed in a typical auxiliary base station. This drawing shows two extra millimeter wave transceivers 36 and 38 for communicating with two auxiliary base stations that typically would be beyond the reach of millimeter wave radios from the aggregating base station either because of distance or obstructions. The station also includes an Ethernet switch 40 for packet and multiplexing signals from the auxiliary-relay base station 4B and two auxiliary base stations 4A (not shown). The relay-auxiliary base station also is equipped with the same carrier to digital-baseband converter and carrier to digital-baseband converter as the other auxiliary base stations as indicated at 42.

Aggregation Base Stations

Figure 5:
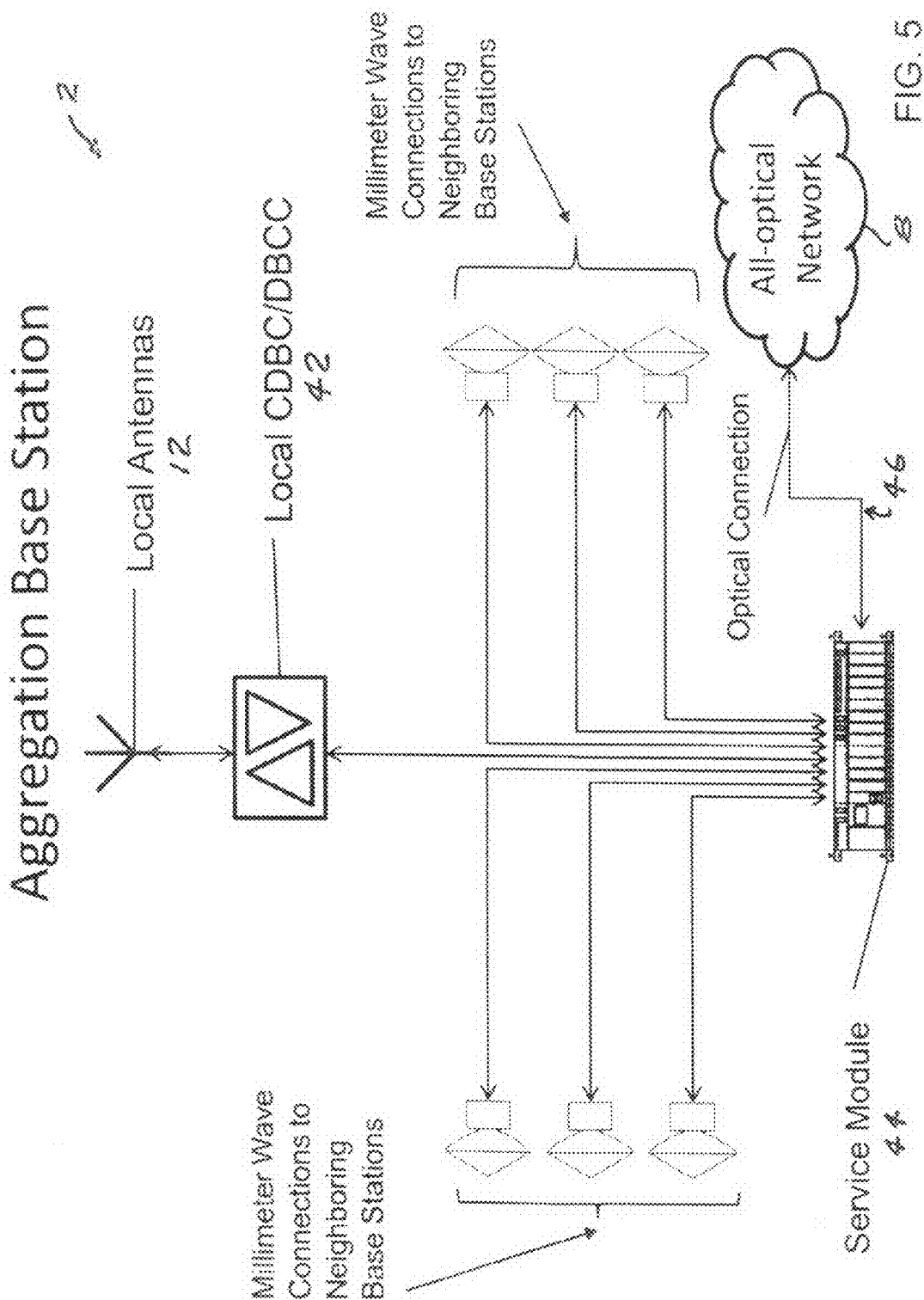
FIG. 5 shows some of the components of an aggregation base station.

FIG. 5 shows important features of the aggregation base stations 2. These features include converter equipment 42 equivalent to that described for the auxiliary base stations as shown in FIGS. 2 and 3 and local cellular antennas 12. The aggregation base stations also includes 6 millimeter wave radio transceivers 14 for millimeter wave wireless communication with neighboring relay-auxiliary base station. In addition the aggregation base station 2 also includes an aggregation base station service module 44 that is further described by reference to FIG. 6 discussed below. The aggregation base station as indicated at 46 is in fiber optical communication with an all optical communication network 8.

Aggregation Base Station Service Module

Figure 6:
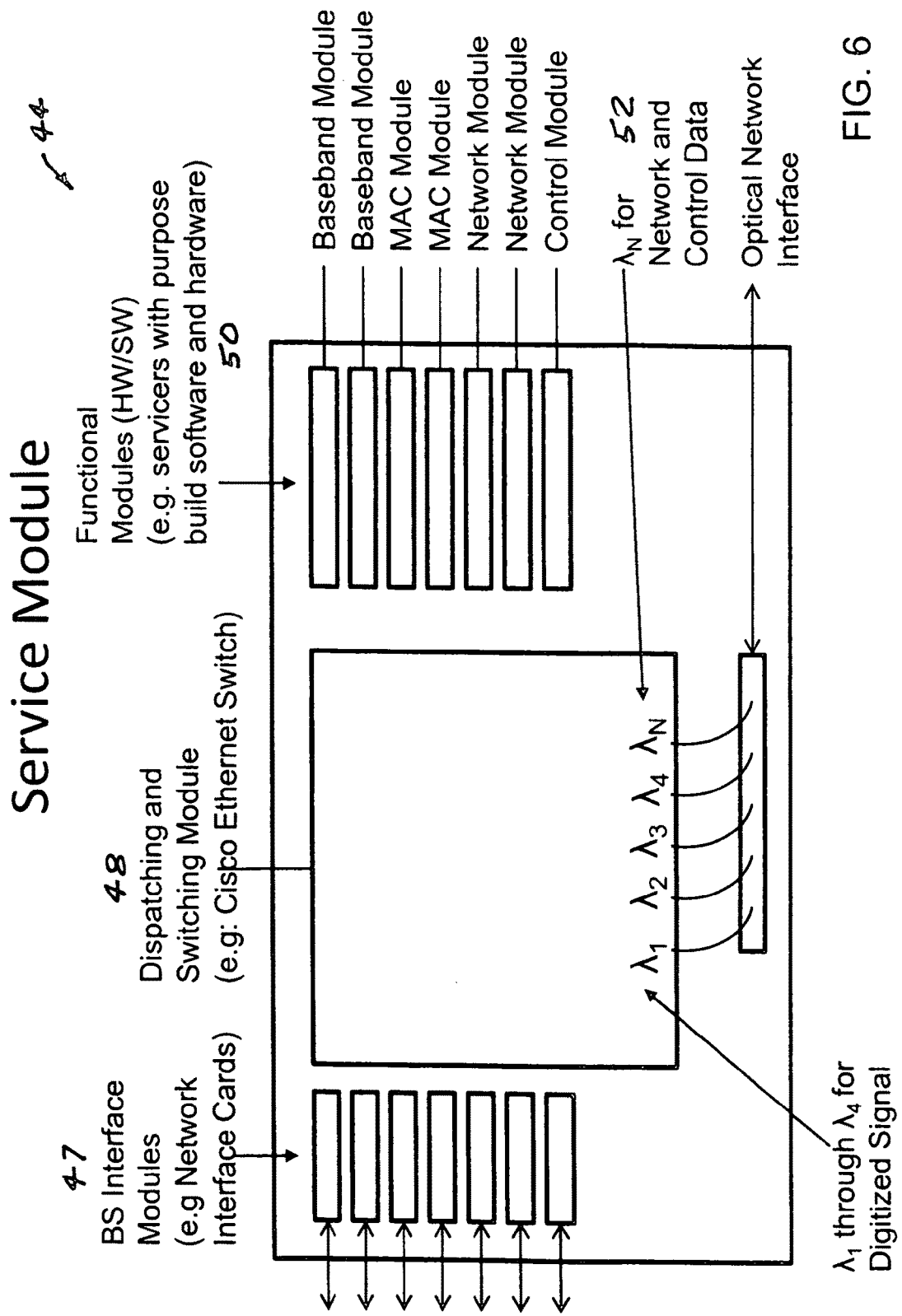
FIG. 6 shows the principal components of aggregation base station service module.

The principal features of aggregation base station service module 44 are described in FIG. 6. These include base station interface modules 47 which are network interface cards for interfacing with other base stations through millimeter wave radios and a dispatching and switching module 48 which can be an Ethernet switch. The aggregation base station also includes functional and service modules 50 typical of existing base stations such as baseband processing modules, medium-access/multiple-access controller (MAC) modules, Network modules and a control module. The dispatching and switching module 48 includes multiplexing and de-multiplexing components indicated at 52 for multiplexing and de-multiplexing signals to provide the fiber optic interface with the master optical switching and processing station 6 as shown in FIG. 1.

Master Optical Switching and Processing Station

Figure 7:
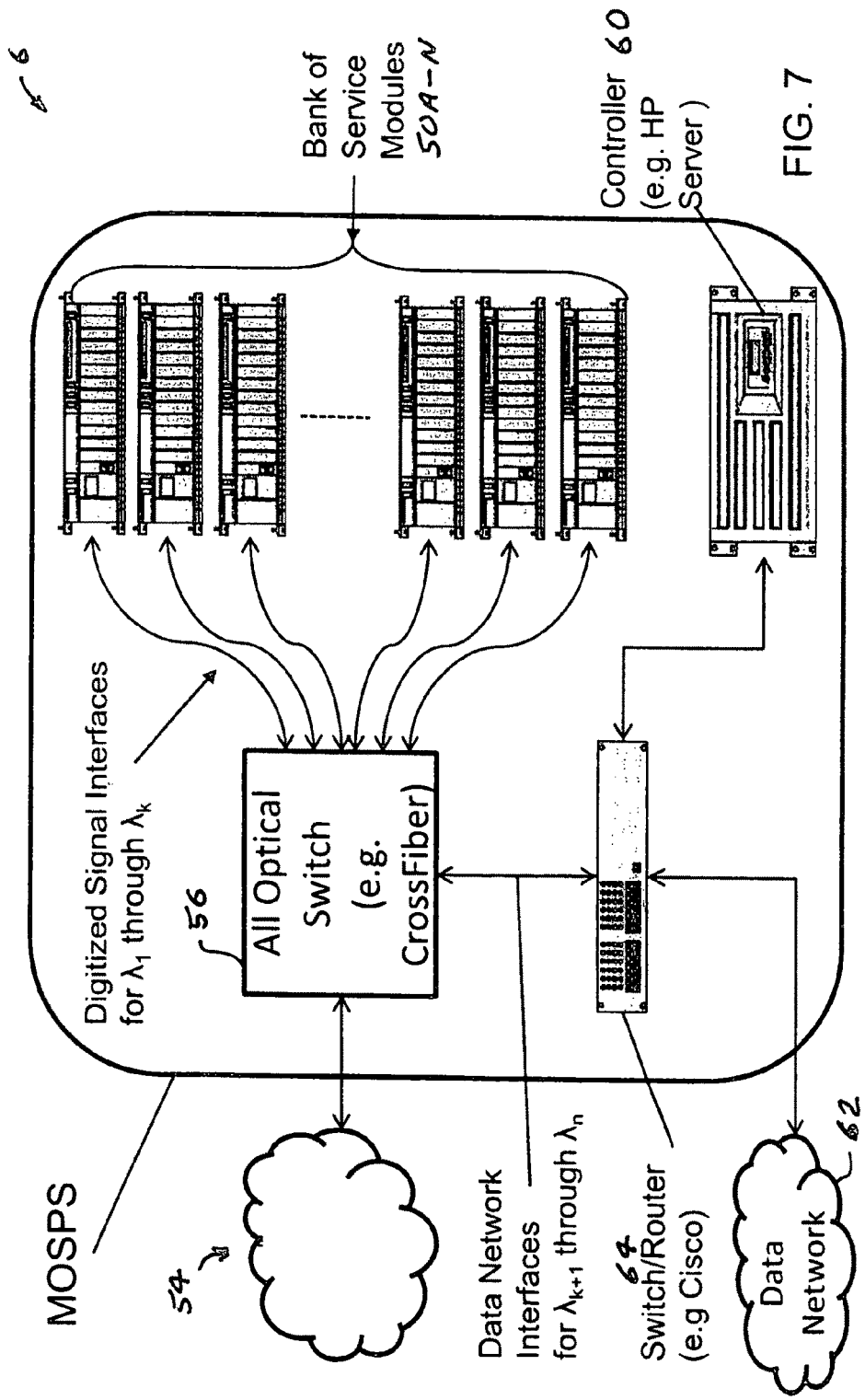
FIG. 7 shows the principal components of a master optical switching and processing station.
Figure 8:
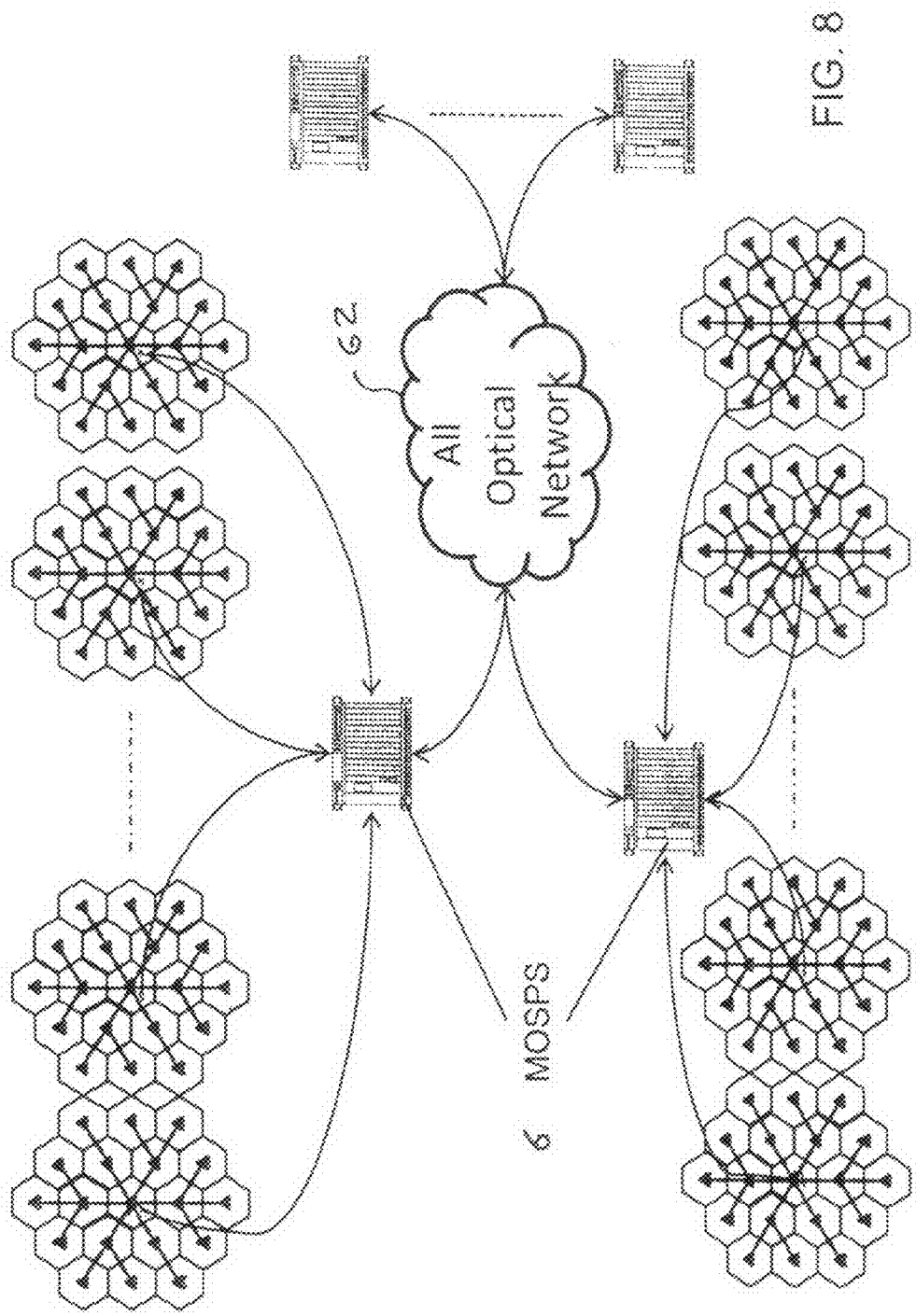
FIG. 8 is a drawing of a global network architecture utilizing more than one system of the present invention.

FIG. 7 shows the principal features of a master optical switching and processing station 6. This station is in fiber optical communication with the aggregation base stations 2 and with and all optical network 8 as indicated in FIG. 7 and in FIG. 1. Digital base-band signals from the aggregation base stations as shown at 54 are routed to an all optical switch 56 which provides direct optical communication to a bank of service modules which may include a large number (such as 10 to 50) of service modules 50A through N similar to service modules 50 shown in FIG. 6 without the base station interface modules. The station also includes a controller 60 (which could be a server of the type of controller server available from Hewlett-Packard) providing the control function for the station. This master controller is in control of all of the service modules in the aggregation base stations and the service modules in the master station. The master controller at the master station is able to efficiently utilize all of the service modules in the system so that in the event the service modules in one or more aggregation base stations are on the verge of becoming over-loaded, the master system controller can transfer service functions from those aggregations to the service modules in the master optical switching and processing station or to service modules in other aggregation base stations. The master optical switching and processing station is in communication with a data network 62 that may include the Internet through router 64. FIG. 8 is a drawing of a global network architecture utilizing more than one system of the present invention.

Second Preferred Embodiment

Enhanced Spectral Efficiencies

Through Communication with Users through Multiple Base Stations

Figure 9B:
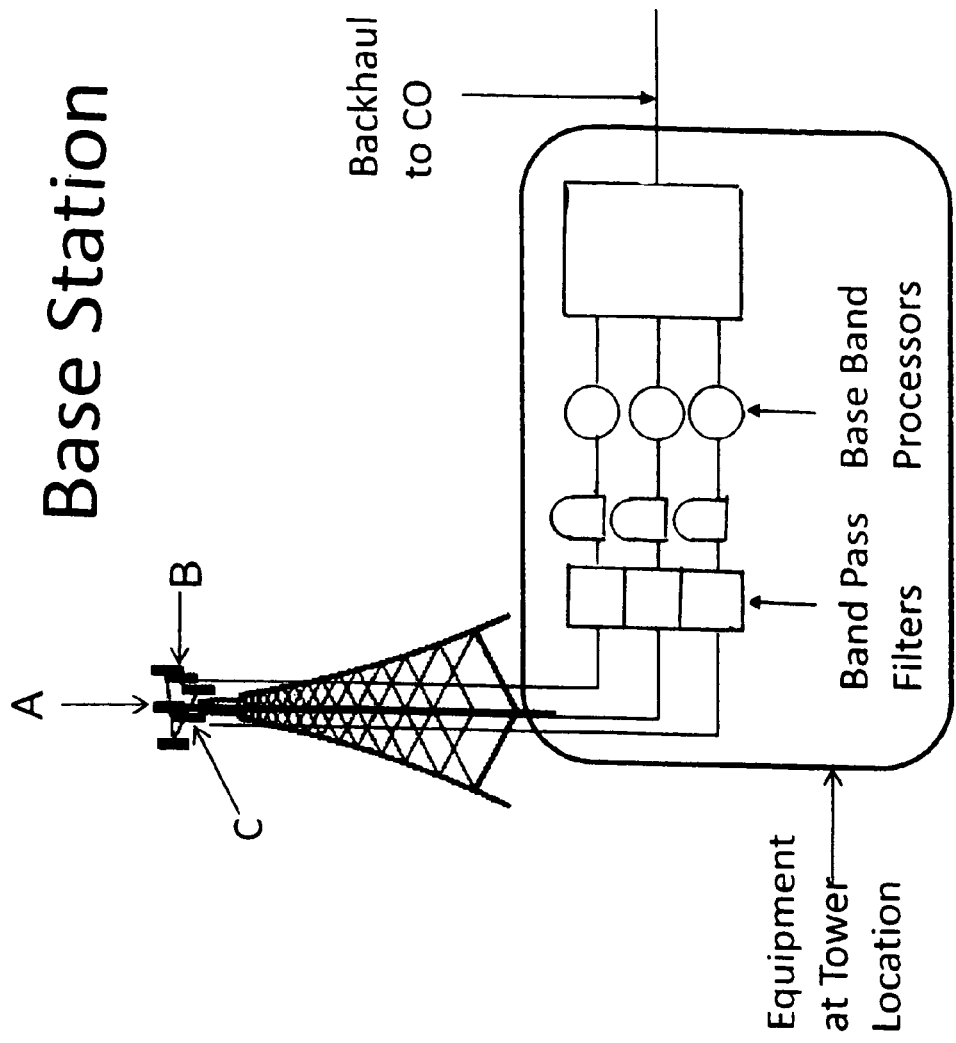
FIGS. 9A and 9B show features of a typical prior art base station architecture.
Figure 9A:
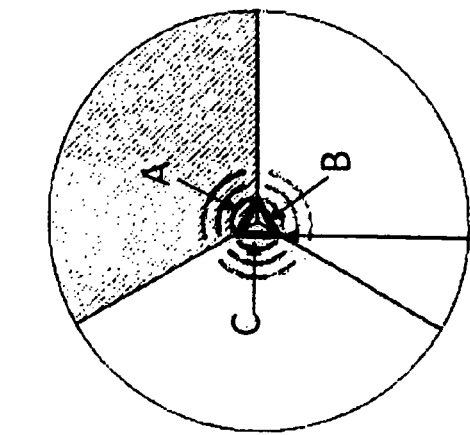
Figure 10:
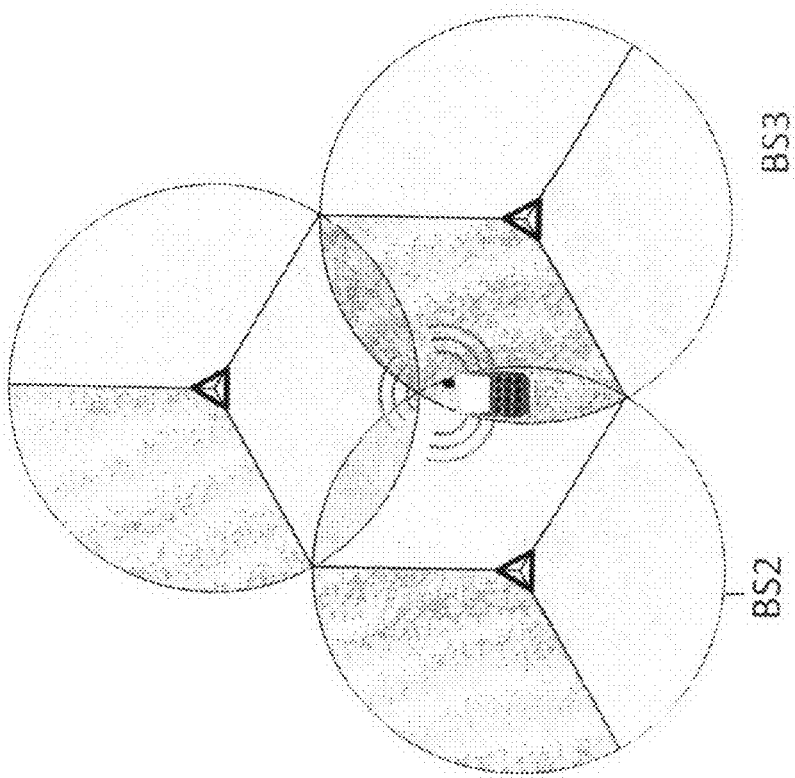

FIGS. 9 through 21 illustrate a second preferred embodiment in which a key benefit of this architecture can be realized. In traditional cellular network architecture, each cellular base station acts as in independent entity. As illustrated in FIG. 9, located at each base station is a set of antennas that receive and transmit radio signals and a set of processing equipment that process these signals. Even though signals transmitted by a mobile handheld devices propagate omni-directionally and is received by neighboring base stations as shown in FIG. 10, all but one of the base stations discards the signals. Only the base station that receives the strongest signal processes it and extracts information. In the same fashion, only one base station transmits signal to the mobile devices.

By harnessing the signal received by all the neighboring base stations, the system can achieve higher performance for communication channel between mobile handheld devices and base stations, effectively increasing the spectral efficiency of the channel. This embodiment provides for harnessing these signals and increasing the spectral efficiency of mobile wireless network.

Figure 11:
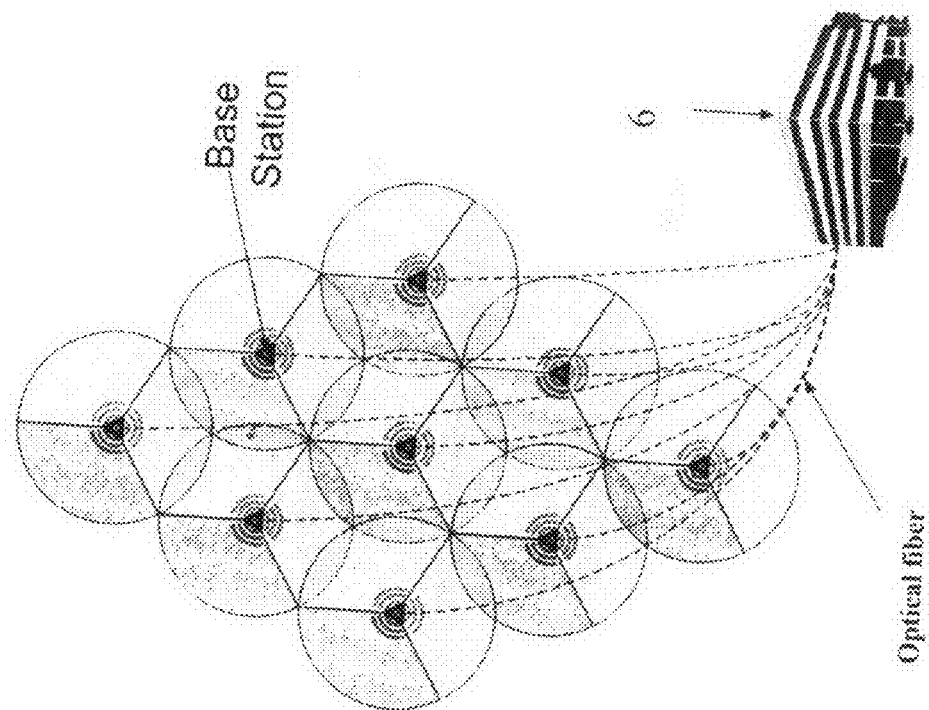
FIGS. 10 and 11 show the prior art technique for dividing the spectrum to prevent interference where signals collected by two of three base stations are discarded.
Figure 12:
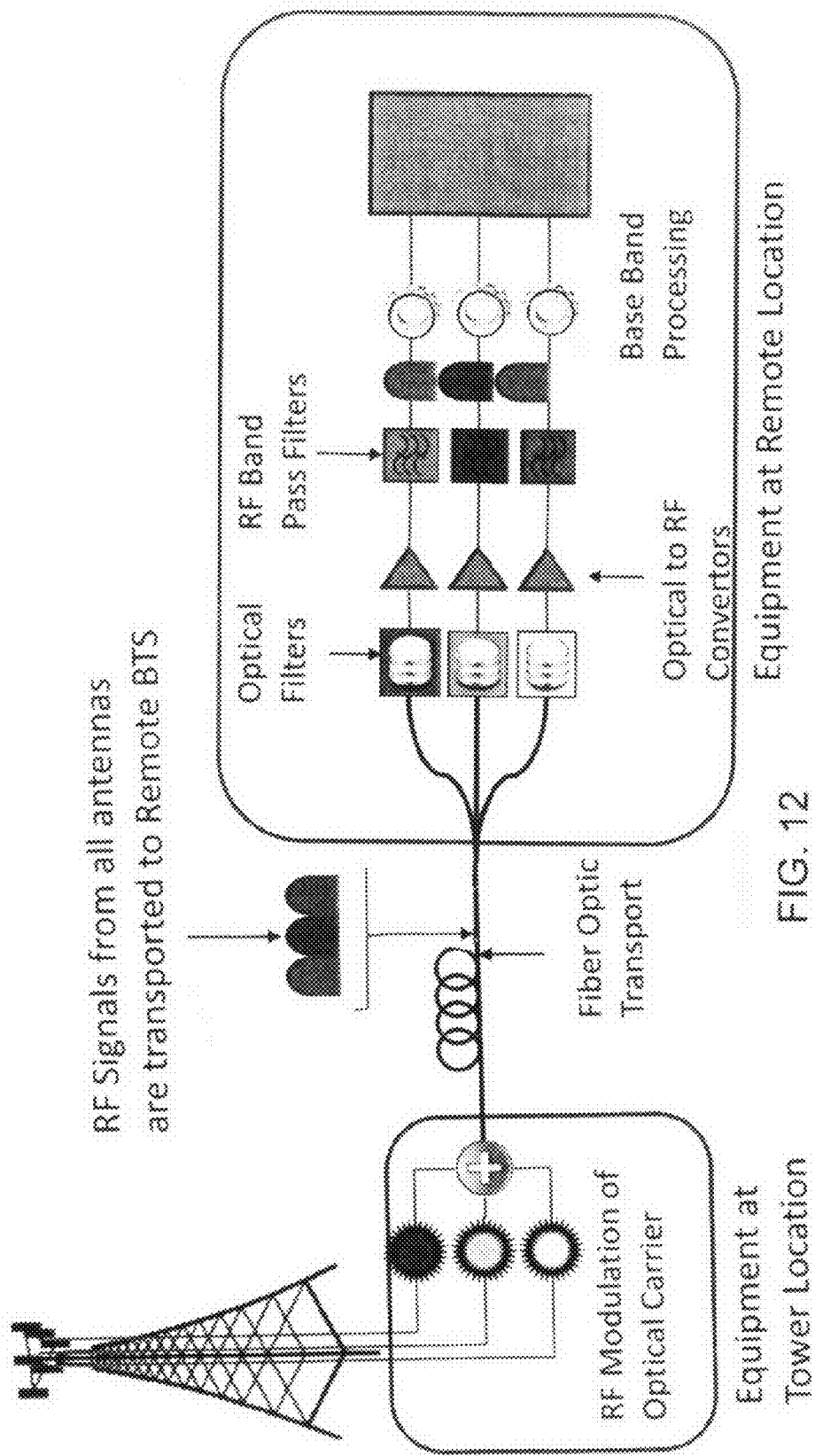
FIG. 12 shows a prior art technique where RF is transported from base station to a remote base station for processing of signals collected by only one base station.

In this method, all base stations are connected directly or indirectly to a central office (CO) by means of a fiber optic cable as shown in FIG. 11 or the connection may be via high bandwidth millimeter wave or microwave radio beams. Analog RF signals from each antenna of a base station are transported (in their RF form either electrically or optically) to a central office. FIG. 12 shows transmission by means of RF modulation of optical signals. Signals from each antenna is transported using a distinct optical carrier signals. At the CO, the optical signals are filtered and demodulated to recover the original RF signal as received by the antenna. Once recovered, the RF signals are processed by processing entities at the CO.

Figure 13:
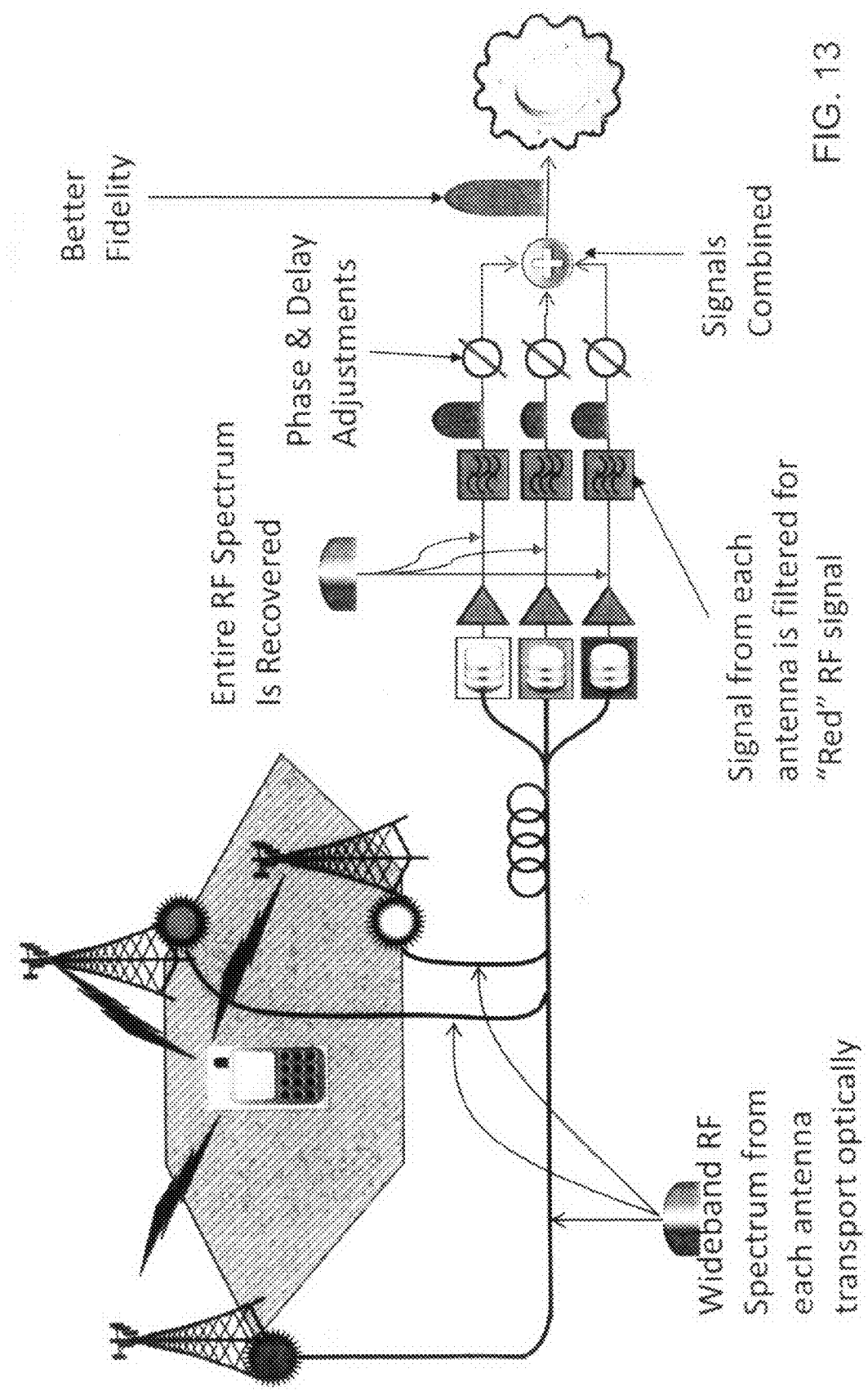
FIG. 13 demonstrates a technique of the present invention for combining signals from three base stations.
Figure 14A:
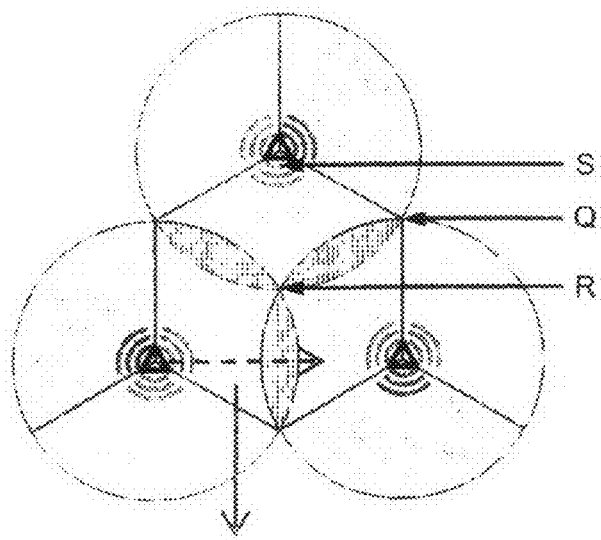
FIGS. 14A and 14B demonstrate advantages of combining signals.
Figure 14B:
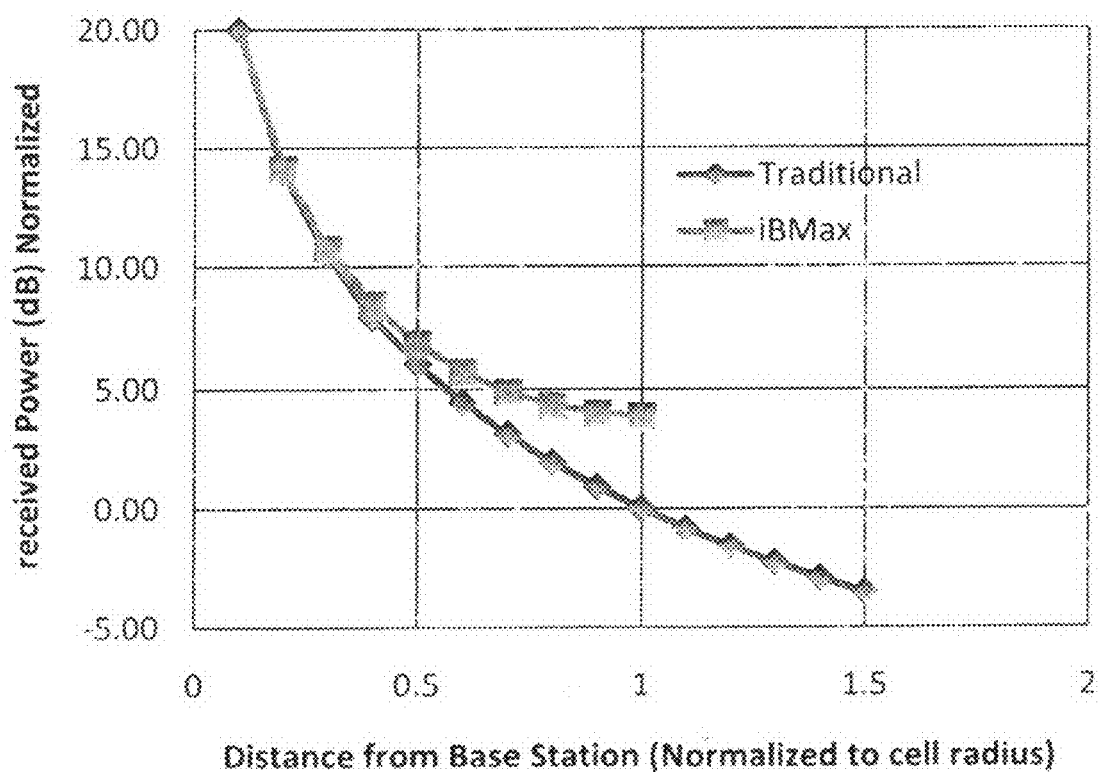

FIG. 13 illustrates how this method described above is used to harness the signals received at three base stations. Signals transmitted by a mobile device are received by the three neighboring base stations. The RF signals from the three base stations are processed (for example, phase adjusted) and combined together to construct a resulting signal. The combined signal will have higher power than each individual signal. For example, for a mobile devices located at approximately equidistance of all three base station, the combined signal will have approximately three times higher power than in case of traditional method. FIGS. 14A and 14B illustrate signal strength surplus as compared to traditional architecture as a mobile user moves along a cell from one base station to another. The higher power results in increased channel capacity, allowing for higher data throughput between the mobile device and the base station. The same technique would work equally well for signal transmitted from base stations to the mobile device, when pre-processed (eg. phase adjusted) signals are transmitted by three base stations simultaneously.

Figure 15B:
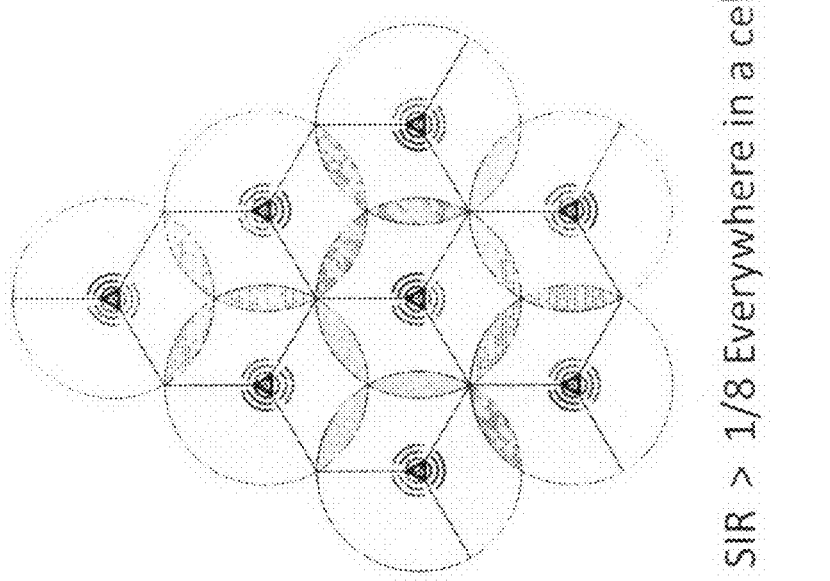
FIGS. 15A and 15B compare the present invention to the prior art.
Figure 15A:
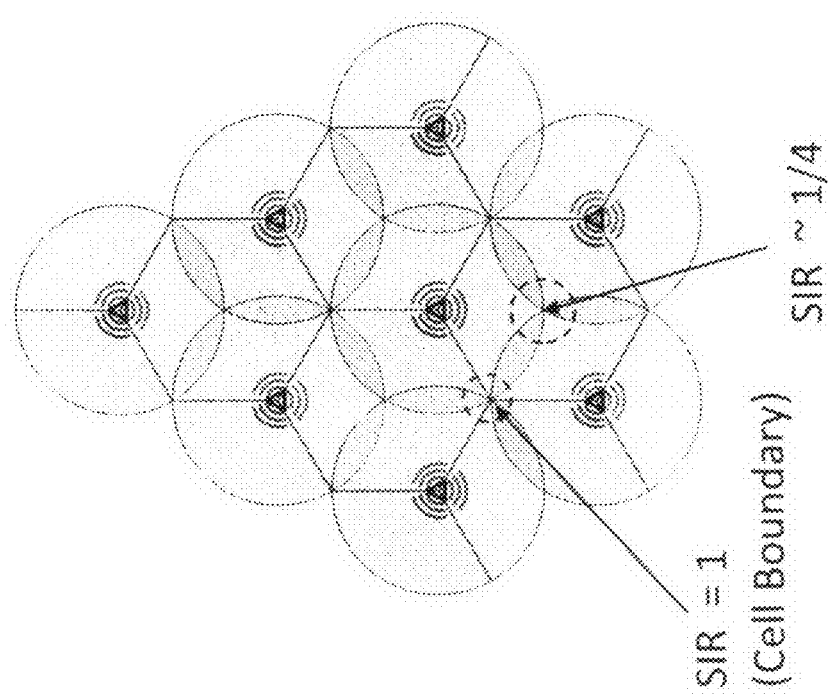
Figure 16B:
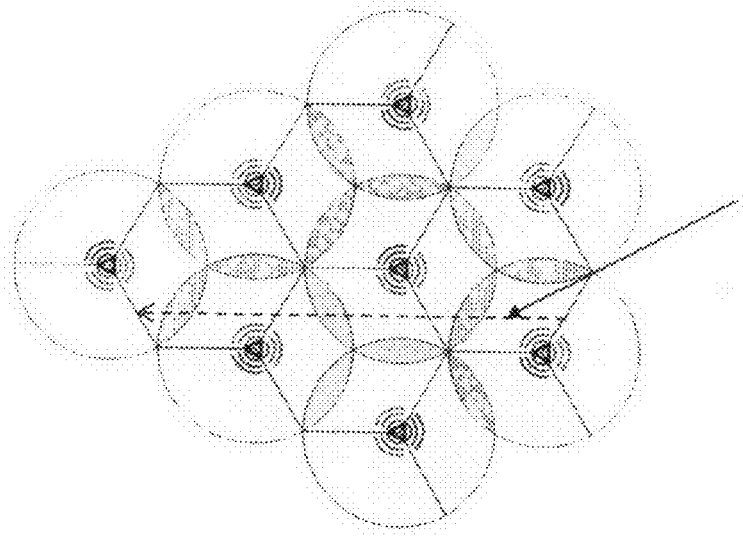
FIGS. 16A and 16B show a hand-off advantage.
Figure 16A:
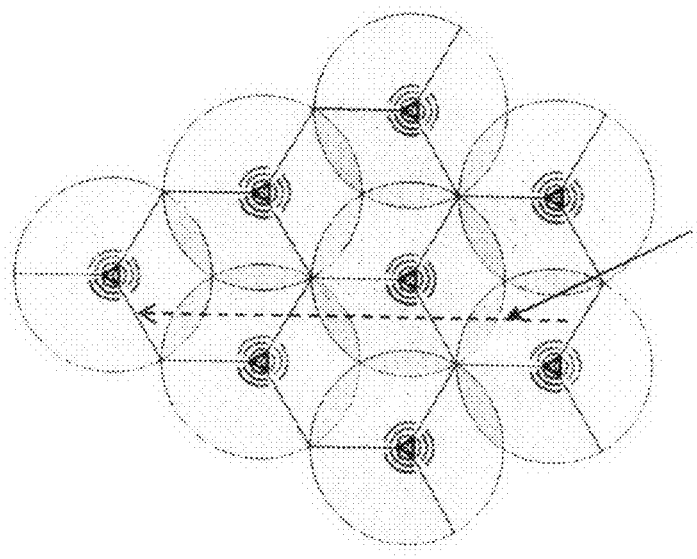
Figure 17B:
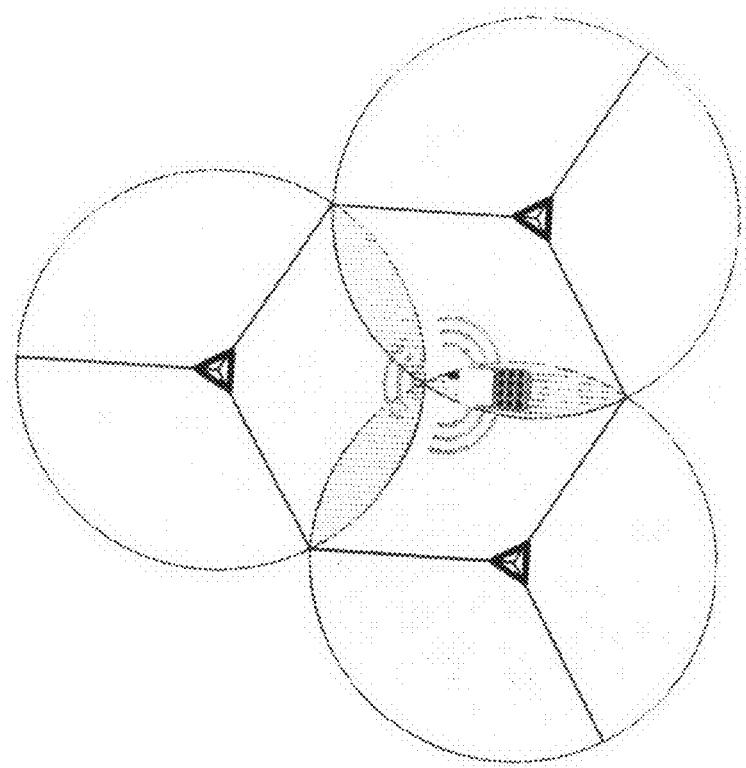
FIGS. 17A and 17B compare the present invention to the prior art.
Figure 17A:
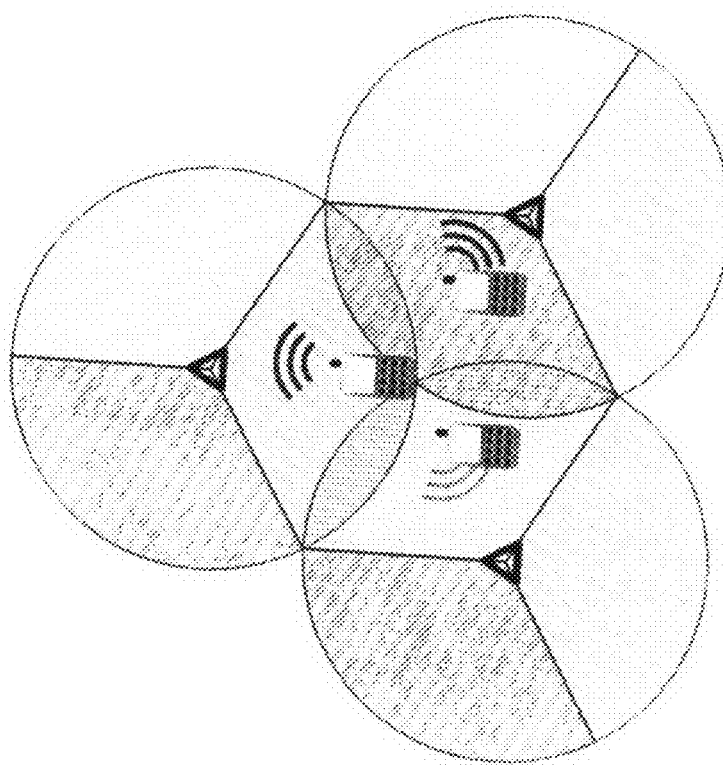
Figure 18B:
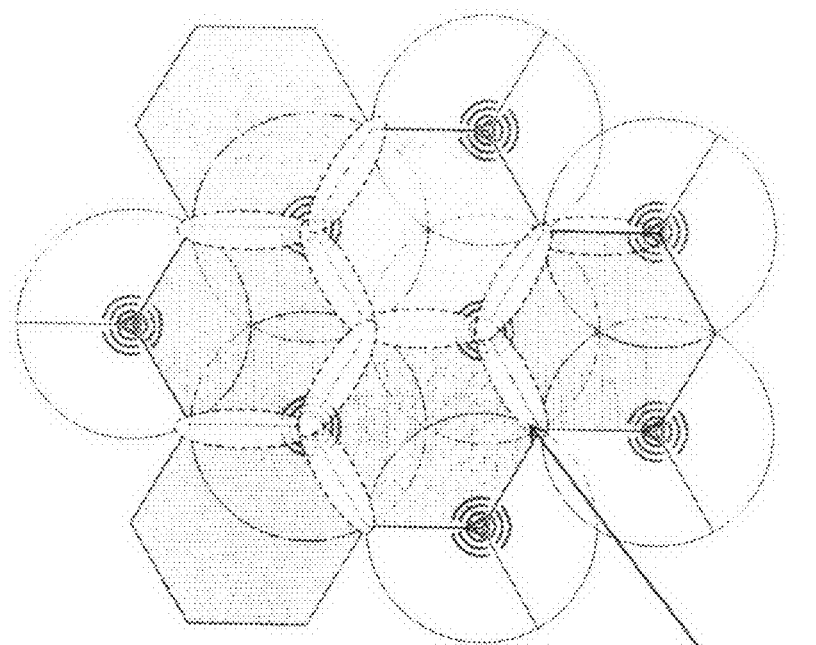
FIGS. 18A and 18B show improved frequency reuse.
Figure 18A:
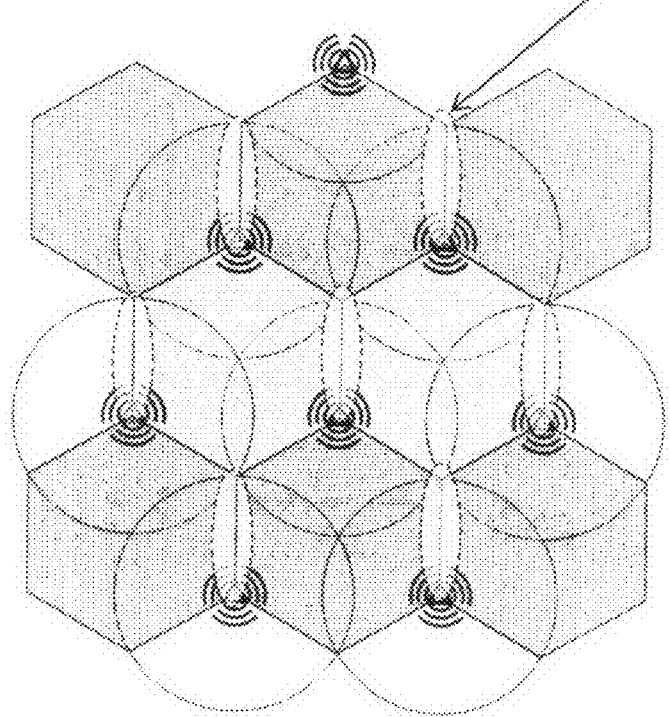

In addition to the improvements in efficiency of a spectrum's utilization, the architecture also improve the amount of interference between neighboring cells as indicated in FIG. 15A and 15B and the complexity of cellular handoff as a mobile user moves from one cell to another as indicated in FIGS. 16A and 16B. But, most importantly, the architecture has a potential to improve spectral reuse factor to as high as 1 from traditional limitation of ⅓. In other words, in order to avoid interference neighboring cells, in traditional method each sector of a base station uses a band of spectrum that is different from the band used by the nearest sectors. The proposed architecture however significantly reduces that limitation because of the change in cellular structure it introduces as shown in FIG. 17B the present invention requires only a single frequency band to cover a region corresponding to the region covered in the prior art by three frequency bands as shown in FIG. 17A. The renewed structure allows all the cells to use a single band of spectrum for all cells (reuse factor of 1 with 3 interference zones per cell), or two band of spectrum (reuse factor of ⅔ with just 1 interference zone per cell).

Figure 21:
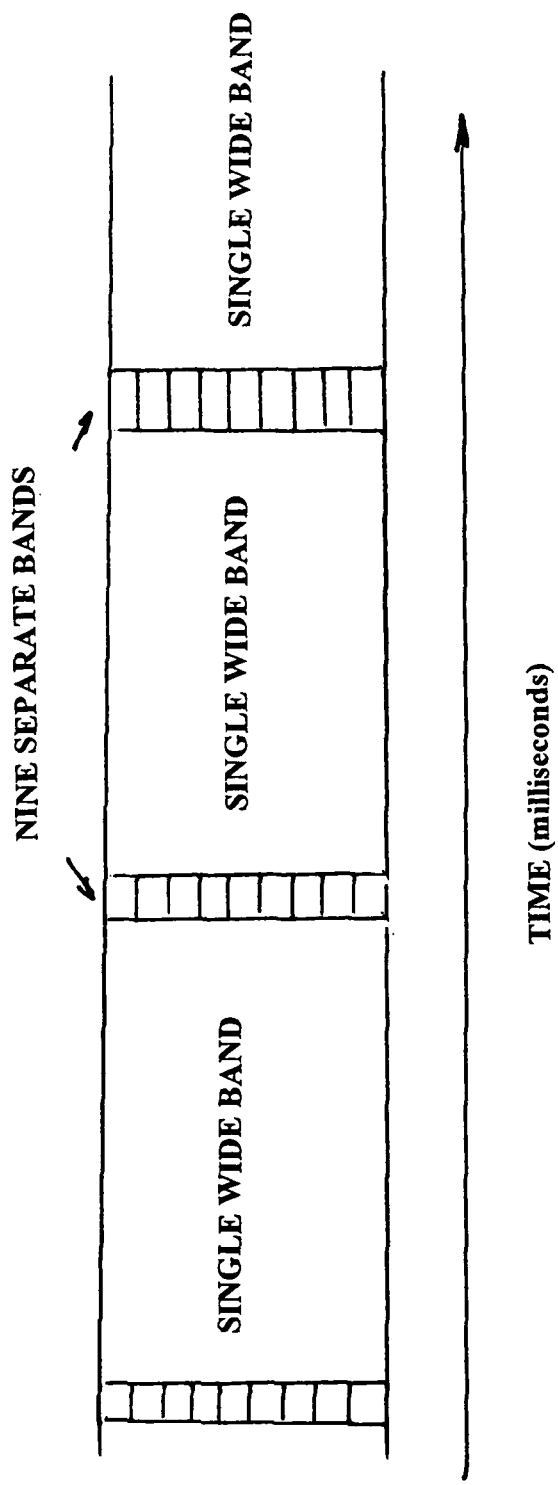
FIG. 21 illustrates a preferred technique to avoid interference in or near boundary regions.

In order to address interference issues at the boundaries and to communicate with the users who are at the interference zones, Applicants have developed a method that makes use of mixed architecture with scheduling. With this technique, as shown in FIG. 21, all base stations operate simultaneously by making use of a single spectral band equivalent to three spectral bands of the prior art system for majority of time. However, for short durations of time, neighboring base station operates at nine different frequencies to communicate with users located along the boundary between the neighboring cells. All base stations repeat this process periodically. With this technique, as the number of users at the boundary approaches 0, the network achieves frequency reuse factor of 1, the highest theoretical limit.

Figure 19:
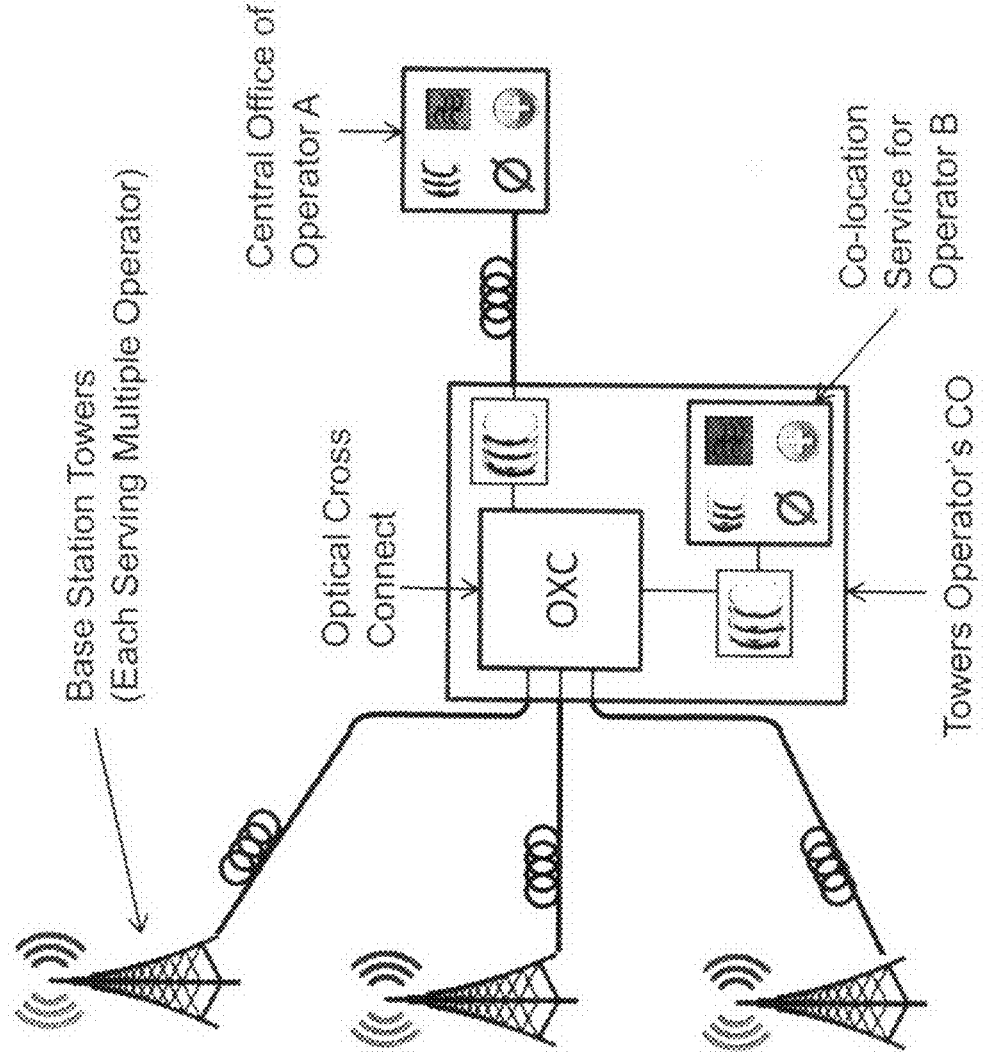
FIG. 19 shows locations of cellular equipment.
Figure 20:
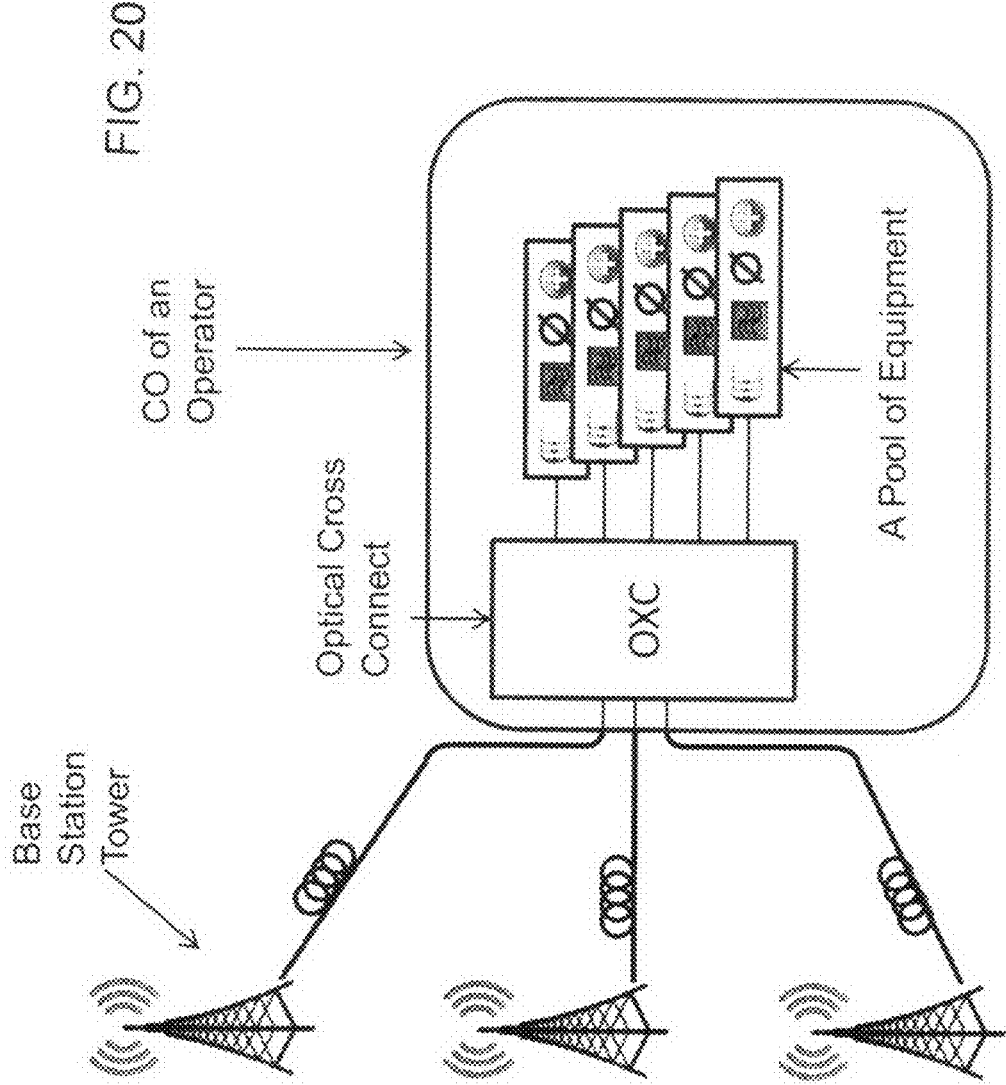
FIG. 20 shows better redundancy and reliability.

In addition to better spectral efficiency and better frequency reuse, the method also provides for a highly flexible network architecture enabling methods for multiple wireless operators to use a single base station tower as indicated in FIG. 19 and methods for higher reliability and redundancy as indicated in FIG. 20.

Variations

The above description is a detailed description of one preferred embodiment of the present invention. Persons skilled in this art will recognize that many changes and variations are possible without substantial deviation from the basic concepts of the present invention. For example, digital baseband data from more or fewer than 19 base station may be aggregated at an aggregation base-station. In addition, instead of using millimeter wave radios to aggregate digital-baseband data, other high bandwidth digital communication technologies such as optical fiber communications or free space optical communication may be used. In an alternation variation of the invention, the digital baseband signals from an aggregation base station may all be transported to a MOSPS for processing instead being processed at aggregation base stations. In a slight variation of this alternate architecture, digital baseband signals may not be aggregated at aggregation base stations but be directly transported to a MOSPS by means of high bandwidth communication medium such as optical fiber communications. In yet another variation of the invention, the baseband signal may not be digitized at each auxiliary base station, but instead transported in its analog form to an aggregation base station where they are processed. The signal may be transported from auxiliary base station to aggregation base station by using millimeter wave wireless links using a variety of techniques other than the one specifically described above. The baseband signals may be transported over optical fiber communication by using some of the techniques outlined patent application Ser. No. 10/677,590 referred to above. In this variation of the invention, the baseband signals may also be transported directly to a MOSPS, instead of to an auxiliary-base station, for processing.

What is claimed is:
1. A bandwidth allocation and management system for cellular communication networks comprising:
  A) a number of aggregation base stations, each comprising at least one service module equipped with functional modules, each designed to provide wireless network functions comprising processing functions, multiple access functions and network functions;
  B) a plurality of auxiliary cellular base stations surrounded by, in communication with and supported by each aggregation base station; and
  C) at least one master optical switching and processing station, each of said at least one master optical switching and processing stations being in optical communication with the number of aggregation base stations comprising:
    (1) a plurality of service modules wherein each service module is equipped with functional modules, each designed to provide wireless network functions comprising processing functions, multiple access functions and network functions,
    (2) an all optical switch providing direct optical communication among said plurality of service modules, and
    (3) a master controller adapted to transfer service functions via the all optical switch from service modules in aggregation base stations that may be overloaded to service modules in other aggregation base stations having unused capacity, and wherein a plurality of sets of three neighboring base stations are each adapted to:
  i) receive and process RF signals transmitted by cellular users within a broadcast and receive range common to each of the three neighboring base stations and
  ii) transmit in analog form the RF signals, received, by each of the three neighborhing base stations from cellular users within the broadcast and receive range, to the master optical switching and processing station and wherein the master optical switching and processing station is adapted:
  i) to process RF signals received from each of the three base stations,
  ii) to combine, for each user within the broadcast and receive range, the three RF signals, and
  iii) to convert the combined three RF signals for each such user to digital form for transmission to other users within the cellular communication network or others outside the network.

2. The bandwidth allocation and management system as in claim 1 wherein the bandwidth allocation and management system comprises at least a plurality of millimeter wave communication links adapted to provide millimeter wave communication between each of at least a plurality of the aggregation base stations and one dr more auxiliary base stations.

3. The bandwidth allocation and management system as in claim 2 wherein each of a plurality of the auxiliary cellular base stations:
  A) is in wireless communication through a number plurality of antennas defining a number of antennas with users in its cell at a similar number of narrow cellular frequency ranges within a broader frequency range below 11 MHz and
  B) is also in wireless millimeter wave communication with one of the aggregation base stations at a millimeter wave frequency in excess of 70 GHz.

4. The bandwidth allocation and management system as in claim 2 wherein each of at least a plurality of the auxiliary cellular base stations is in wireless communication through one or more antennas with users in its cell at a similar number of narrow cellular frequency ranges within a broader frequency range below 11 MHz.

5. The bandwidth allocation and management system as in claim 2 wherein each of at least a plurality of the auxiliary base stations comprises a plurality of digital baseband to carrier frequency converters and
  A) is equipped with a multiplexing/de-multiplexing switch for separating streams of digital data incoming over millimeter radio into individual streams of packetized digital baseband data directed to one of the digital baseband to carrier frequency converters for extraction of the baseband signal from the stream of packetized digital-baseband data by means of analog-to-digital conversion and for up-conversion of the baseband signal to carrier frequency for transmission over a cellular radio frequency; and
  B) is also equipped with a carrier frequency to digital baseband converter for conversion of signals received from cellular system users to a packetized digital-baseband signal by means of down-conversion to baseband signal and analog-to-digital conversion of the baseband signal.

6. The bandwidth allocation and management system as in claim 5 wherein at least a plurality of said auxiliary base stations are auxiliary-relay base stations and are equipped with switching and relaying equipment for multiplexing and relaying packetized digital-baseband data to and from other auxiliary base stations.

7. The bandwidth allocation and management system as in claim 6 and further comprising millimeter wave communication links adapted to provide communication among at least a plurality of the aggregation base stations, the auxiliary-relay base stations and auxiliary cellular base stations.

8. The bandwidth allocation and management-system as in claim 2 wherein at least a plurality of the aggregation base stations are equipped with at least one service module having an interface module adapted to interface with a plurality of millimeter wave radios installed at the aggregation base station and linked to a plurality of auxiliary base stations, said service module being adapted to aggregate digital baseband signals from all the plurality of auxiliary base stations.

9. The bandwidth allocation and management system as in claim 8 wherein each service module is also equipped with a switching module for multiplexing and de-multiplexing of packetized digital-baseband data and to switch the packetized digital-baseband data among baseband processing functional modules, millimeter wave radios and optical signal interfaces.

10. The bandwidth allocation and management system as in claim 2 wherein the bandwidth allocation and management system comprises a plurality of optical fiber links adapted to provide communication between a plurality of the aggregation base stations and the at least one master optical switching and processing station.

11. The bandwidth allocation and management system as in claim 1 wherein the master optical switching and processing station is equipped with a bank of service modules adapted to provide optical signal switching via all optical switches.

12. The bandwidth allocation and management system as in claim 11 wherein the master optical switching and processing station is also equipped with a master controller in control of all of the service modules in the bank of service modules in the aggregation base stations and the service modules in the master station.

13. The bandwidth allocation and management system as in claim 12 wherein the master controller is adapted to efficiently utilize all of the service modules in the system so that in the event the service modules in one or more aggregation base stations are on the verge of becoming over-loaded with processing of digital-baseband signal, the master system controller can transfer service functions from those service modules to the service modules in the master optical switching and processing station or to service modules in other aggregation base stations.

14. The bandwidth allocation and management system as in claim 1 wherein all of said plurality of sets of three neighboring base stations are adapted to operate in the same frequency range except periodically for very short periods of time during which periods the neighboring stations transmit at nine different frequencies to avoid interference in user devices located in or near boundary regions.

\* \* \* \* \*